US012060668B2

(12) United States Patent
Choi et al.

(10) Patent No.: US 12,060,668 B2
(45) Date of Patent: Aug. 13, 2024

(54) WASHING MACHINE AND METHOD OF CONTROLLING THE SAME

(71) Applicant: Samsung Electronics Co., Ltd., Suwon-si (KR)

(72) Inventors: Jun Hoe Choi, Suwon-si (KR); Tae-Gyu Kim, Suwon-si (KR); Ji-Hoon Ha, Suwon-si (KR); Jeong Su Han, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 156 days.

(21) Appl. No.: 17/309,863

(22) PCT Filed: Dec. 24, 2019

(86) PCT No.: PCT/KR2019/018436
§ 371 (c)(1),
(2) Date: Jun. 24, 2021

(87) PCT Pub. No.: WO2020/138936
PCT Pub. Date: Jul. 2, 2020

(65) Prior Publication Data
US 2022/0056627 A1 Feb. 24, 2022

(30) Foreign Application Priority Data

Dec. 24, 2018 (KR) .................. 10-2018-0168680

(51) Int. Cl.
D06F 33/36 (2020.01)
D06F 21/04 (2006.01)
D06F 34/22 (2020.01)
G01N 15/06 (2006.01)
D06F 103/20 (2020.01)
D06F 105/02 (2020.01)
G01N 15/075 (2024.01)

(52) U.S. Cl.
CPC .............. D06F 33/36 (2020.02); D06F 21/04 (2013.01); D06F 34/22 (2020.02); G01N 15/06 (2013.01);
(Continued)

(58) Field of Classification Search
CPC .......... D06F 33/34; D06F 33/36; D06F 33/37; D06F 33/38; D06F 33/42; D06F 33/44;
(Continued)

(56) References Cited

U.S. PATENT DOCUMENTS 7,242,001 B1* 7/2007 Hedges .................. G01N 21/85
250/343
2006/0007444 A1 1/2006 Oon et al.
(Continued)

FOREIGN PATENT DOCUMENTS

DE 102007011119 A1 9/2008
EP 1252857 A2 10/2002
(Continued)

OTHER PUBLICATIONS

European Patent Office, "Supplementary European Search Report" issued Jan. 4, 2022, in connection with European Patent Application No. 19903033.9, 7 pages.
(Continued)

Primary Examiner — David G Cormier

(57) ABSTRACT

An aspect of the present disclosure is to provide a washing machine that detects contamination of water due to a dye and prevents contamination of laundry due to the dye. The washing machine includes a tub; a drum configured to be rotatable inside of the tub; a detergent supplier configured to supply a detergent to the tub; a water supplier configured to supply a water to the tub; an optical sensor provided under the tub, wherein the optical sensor includes a light emitting element and a light receiving element configured to selectively receive a plurality of visible rays having different wavelengths and an infrared ray among a light emitted from the light emitting element; and a controller configured to control the water supplier to supply the detergent and the water to the tub and rotate the drum during a washing. In addition, the controller may reduce the washing time based
(Continued)

on the sum of the received intensities of the plurality of visible rays and the received intensity of the infrared ray.

18 Claims, 22 Drawing Sheets

(52) U.S. Cl.
CPC ...... *D06F 2103/20* (2020.02); *D06F 2105/02* (2020.02); *G01N 15/075* (2024.01)

(58) Field of Classification Search
CPC .......... D06F 33/46; D06F 33/47; D06F 33/54; D06F 33/56; D06F 33/57; D06F 33/58; D06F 33/62; D06F 33/70; D06F 33/72; D06F 33/74; D06F 34/22; D06F 2103/02; D06F 2103/06; D06F 2103/20; D06F 2103/22; D06F 2105/02; D06F 2105/08; D06F 2105/42; D06F 2105/52; D06F 2105/54
See application file for complete search history.

(56) References Cited

U.S. PATENT DOCUMENTS

| | | | |
|---|---|---|---|
| 2007/0046942 A1 | 3/2007 | Ng et al. | |
| 2013/0278921 A1 | 10/2013 | Choi et al. | |
| 2017/0237911 A1* | 8/2017 | Won | H04N 25/70 348/164 |
| 2017/0275802 A1 | 9/2017 | Xu et al. | |
| 2017/0342639 A1 | 11/2017 | Kim | |
| 2018/0073177 A1* | 3/2018 | Zattin | D06F 37/36 |

FOREIGN PATENT DOCUMENTS

| | | |
|---|---|---|
| EP | 2455529 A1 | 5/2012 |
| EP | 3798345 A1 | 3/2021 |
| JP | 2007-064982 A | 3/2007 |
| JP | 2009-028113 A | 2/2009 |
| KR | 10-2013-0119357 A | 10/2013 |
| KR | 10-2017-0044198 A | 4/2017 |
| KR | 10-2017-0135230 A | 12/2017 |

OTHER PUBLICATIONS

International Search Report and Written Opinion of the International Searching Authority dated Apr. 23, 2020 in connection with International Application No. PCT/KR2019/018436, 12 pages.
Communication pursuant to Article 94(3) EPC dated Jun. 21, 2023, in connection with European Application No. 19903033.9, 4 pages.
Notice of Preliminary Rejection dated May 21, 2023, in connection with Korean Application No. 10-2018-0168680, 15 pages.
Notice of Patent Allowance dated Aug. 1, 2023, in connection with Korean Application No. 10-2018-0168680, 3 pages.

* cited by examiner

WASHING MACHINE AND METHOD OF CONTROLLING THE SAME

CROSS-REFERENCE TO RELATED APPLICATIONS

This application is a 371 National Stage of International Application No. PCT/KR2019/018436, filed Dec. 24, 2019, which claims priority to Korean Patent Application No. 10-2018-0168680, filed Dec. 24, 2018, the disclosures of which are herein incorporated by reference in their entirety.

BACKGROUND

1. Field

The present disclosure relates to a washing machine and a method of controlling the same, and more particularly, to a washing machine capable of adjusting a washing time and a rinsing time and a method of controlling the same.

2. Description of Related Art

In general, a washing machine is an apparatus configured to wash laundry using a frictional force between the laundry and water. The washing machine generally includes a tub that accommodates the water and a drum that accommodates the laundry and rotates within the tub.

In this way, the washing machine requires the water to wash the laundry, and the washing machine consumes a large amount of water depending on a type. In addition, a sufficient time may be required to wash the laundry.

Recently, in order to reduce the consumption of the water and a washing time, the washing machine is provided with a turbidity sensor that detects a turbidity of the water in the tub, and adjusts a water supply amount and the washing time according to the turbidity of the water.

However, the turbidity sensor used in an existing washing machine generally uses light of a single wavelength, and the turbidity sensor using light of the single wavelength has not been able to identify the turbidity due to various contaminations.

SUMMARY

An aspect of the present disclosure is to provide a washing machine that detects a turbidity (or cleanliness) of water by using a plurality of lights having different wavelengths.

Another aspect of the present disclosure is to provide a washing machine that detects contamination of water due to a dye by using a plurality of lights having different wavelengths.

Another aspect of the present disclosure is to provide a washing machine that detects contamination of water due to a dye and prevents contamination of laundry due to the dye.

An aspect of the present disclosure provides a washing machine including: a tub; a drum rotatably disposed in the tub; a detergent supplier configured to supply a detergent to the tub; a water supplier configured to supply a water to the tub; an optical sensor provided on a lower part of the tub, wherein the optical sensor includes a light emitting element and a light receiving element configured to selectively receive a plurality of visible rays having different wavelengths and an infrared ray among a light emitted from the light emitting element; and a controller configured to control the water supplier to supply the detergent and the water to the tub and rotate the drum during a washing. The controller may be configured to control the optical sensor to emit the light, to receive received intensities of the plurality of visible rays and a received intensity of the infrared ray from the optical sensor, and to adjust a washing time based on a sum of the received intensities of the plurality of visible rays and the received intensity of the infrared ray.

Another aspect of the present disclosure provides a method of controlling a washing machine including: supplying, by a controller, a detergent and a water to a tub and rotating a drum rotatably disposed in the tub during a washing; based on a time remaining until an end of the washing being less than or equal to a first time, emitting rays having different wavelengths, by a light emitting element of an optical sensor provided on a lower part of the tub; receiving a plurality of visible rays having the different wavelengths and an infrared ray, by the light receiving element of the optical sensor; and adjusting, by the controller, a washing time based on a sum of the received intensities of the plurality of visible rays and a received intensity of the infrared ray.

Another aspect of the present disclosure provides a washing machine including: a tub; a drum rotatably disposed in the tub; an optical sensor provided on a lower part of the tub, wherein the optical sensor includes a light emitting element and a light receiving element configured to selectively receive a plurality of visible rays having different wavelengths and an infrared ray among a light emitted from the light emitting element; and a controller configured to control the light emitting element to emit the light towards the light receiving element. The light receiving element may include a filter array including a plurality of color filters configured to selectively transmit the plurality of visible rays each having the different wavelength and an infrared filter configured to selectively transmit the infrared ray, and a photodiode array including a plurality of photodiodes configured to receive rays transmitted through the filter array.

According to an embodiment, a washing machine that detects a turbidity (or cleanliness) of water by using a plurality of lights having different wavelengths may be provided.

According to another embodiment, it is possible to provide a washing machine that detects contamination due to a dye of laundry by using a plurality of lights having different wavelengths.

According to another embodiment, it is possible to provide a washing machine that detects contamination of water due to a dye and prevents contamination of laundry due to the dye.

DETAILED DESCRIPTION

Figure 1:
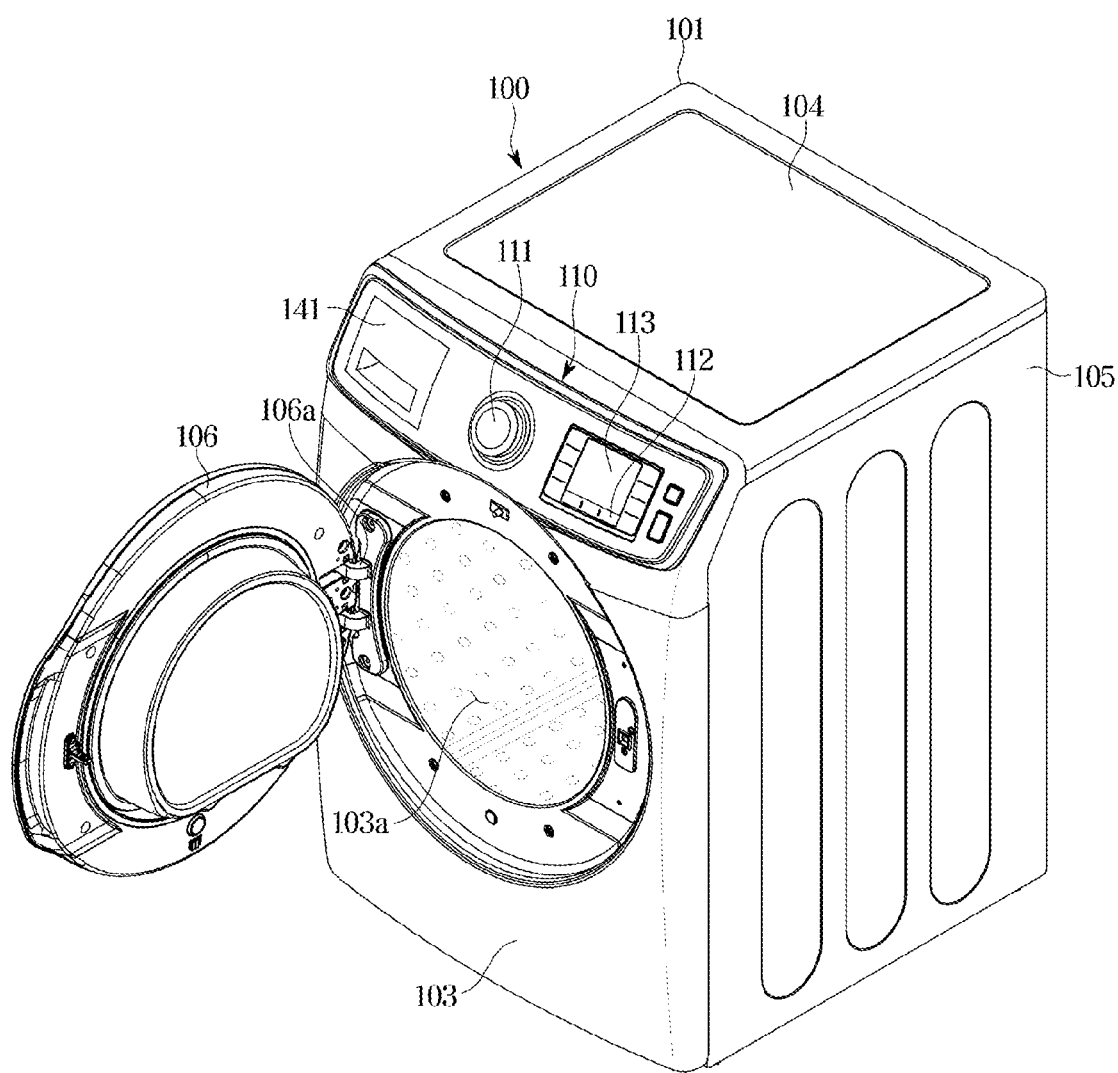
FIG. 1 is a view illustrating an appearance of a washing machine according to an embodiment.

Like reference numerals refer to like elements throughout the specification. Not all elements of the embodiments of the disclosure will be described, and the description of what are commonly known in the art or what overlap each other in the exemplary embodiments will be omitted. The terms as used throughout the specification, such as "~part," "~module," "~member," "~block," etc., may be implemented in software and/or hardware, and a plurality of "~parts," "~modules," "~members," or "~blocks" may be implemented in a single element, or a single "~part," "~module," "~member," or "~block" may include a plurality of elements.

It will be further understood that the term "connect" and its derivatives refer both to direct and indirect connection, and the indirect connection includes a connection over a wireless communication network.

The terms "include (or including)" and "comprise (or comprising)" are inclusive or open-ended and do not exclude additional, unrecited elements or method steps, unless otherwise mentioned.

Furthermore, when it is stated that a layer is "on" another layer or substrate, the layer may be directly on another layer or substrate or a third layer may be disposed therebetween.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section.

It is to be understood that the singular forms "a," "an," and "the" include plural references unless the context clearly dictates otherwise.

Reference numerals used for method steps are merely used for convenience of explanation, but not to limit an order of the steps. Thus, unless the context clearly dictates otherwise, the written order may be practiced otherwise.

Hereinafter, an operation principle and embodiments of the disclosure will be described with reference to accompanying drawings.

Figure 2:
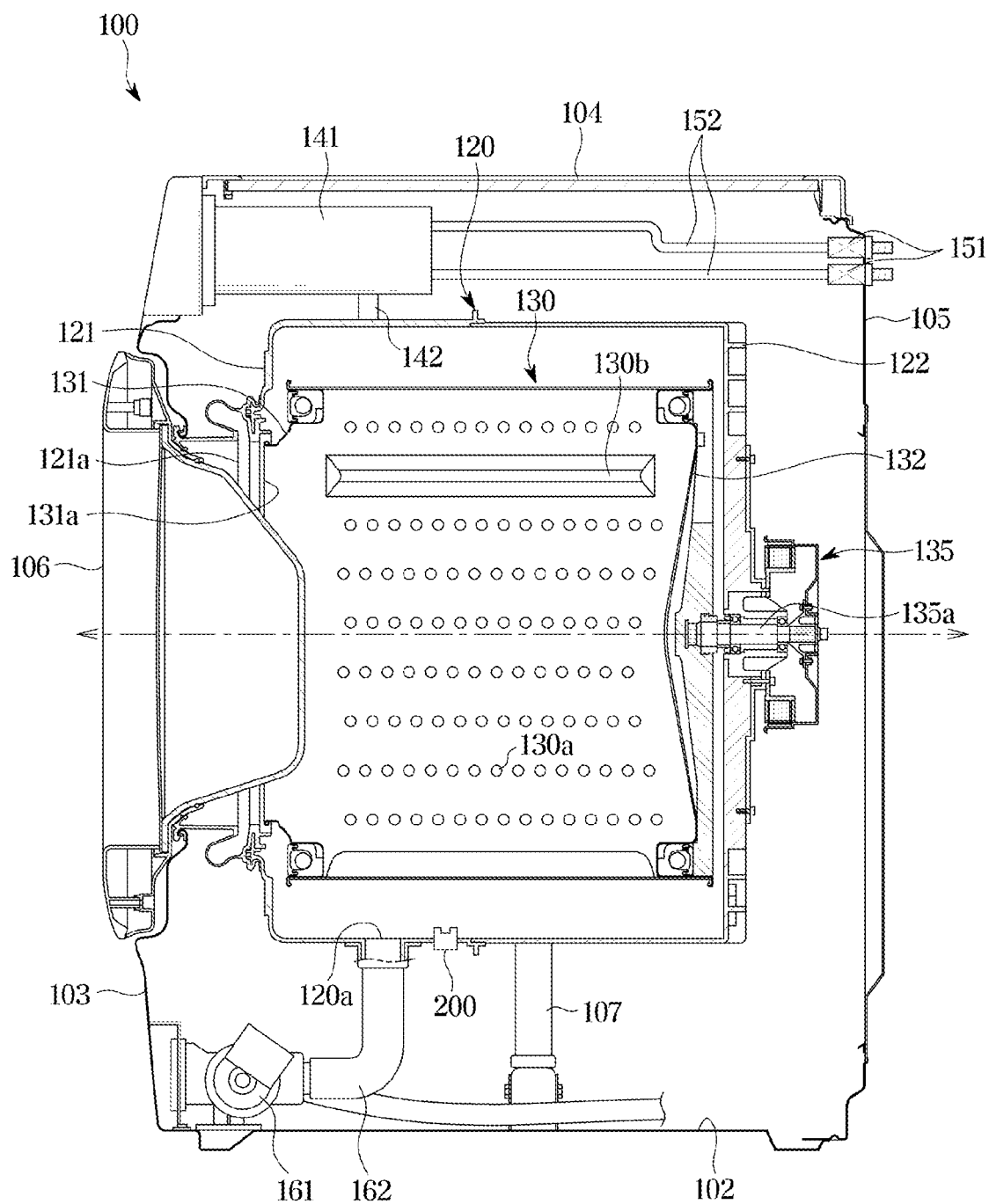
FIG. 2 is a view illustrating a side cross-sectional view of a washing machine according to an embodiment.
Figure 3:
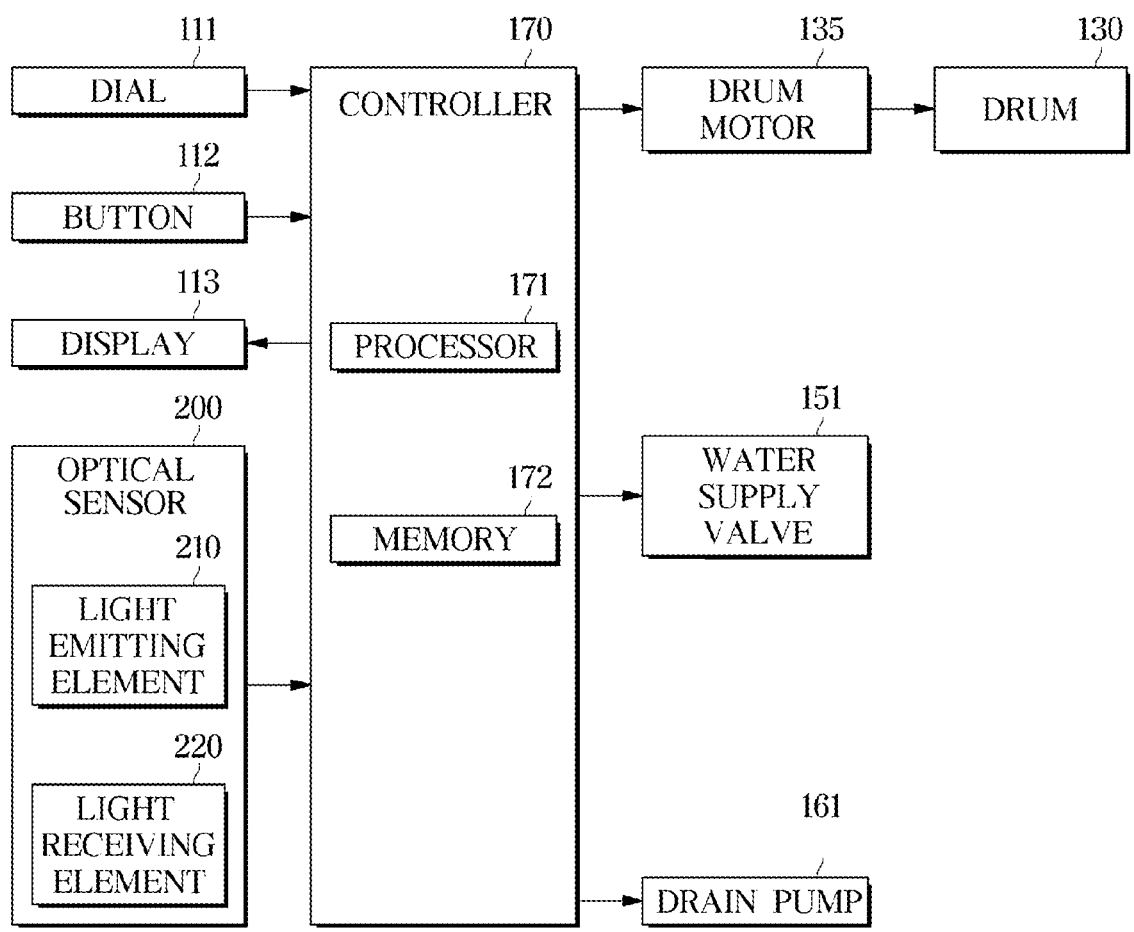
FIG. 3 is a view illustrating a configuration of a washing machine according to an embodiment.
Figure 4:
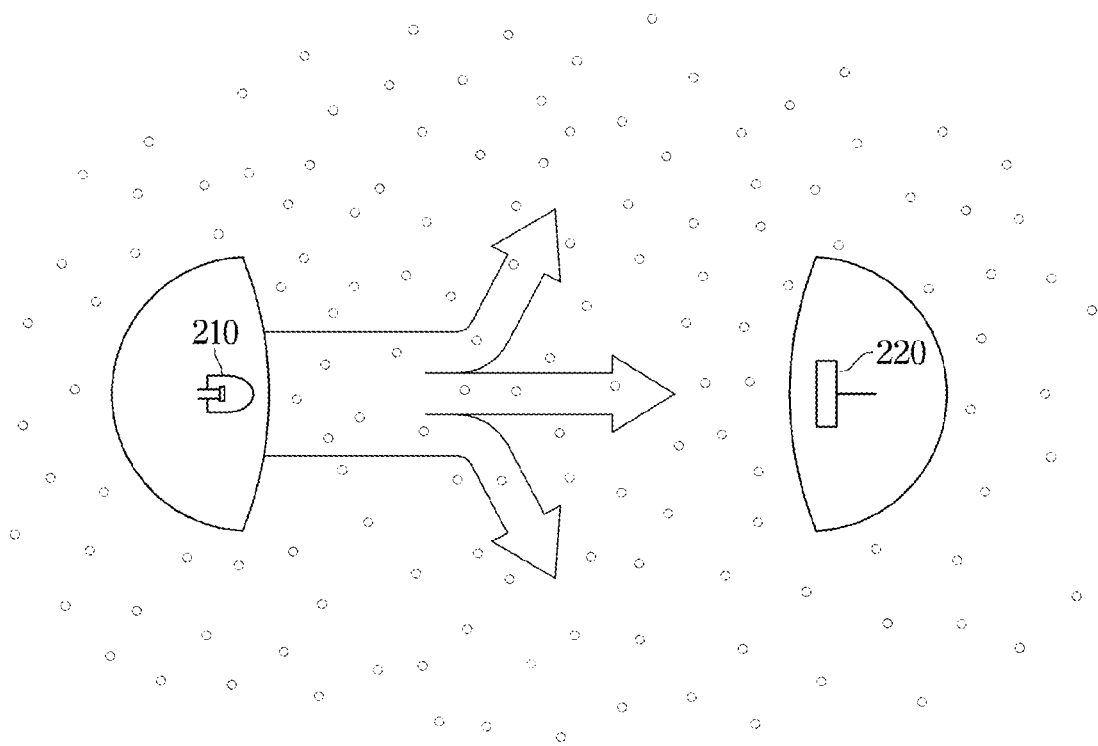
FIGS. 4 and 5 are views illustrating an operation of an optical sensor included in a washing machine according to an embodiment.
Figure 5:
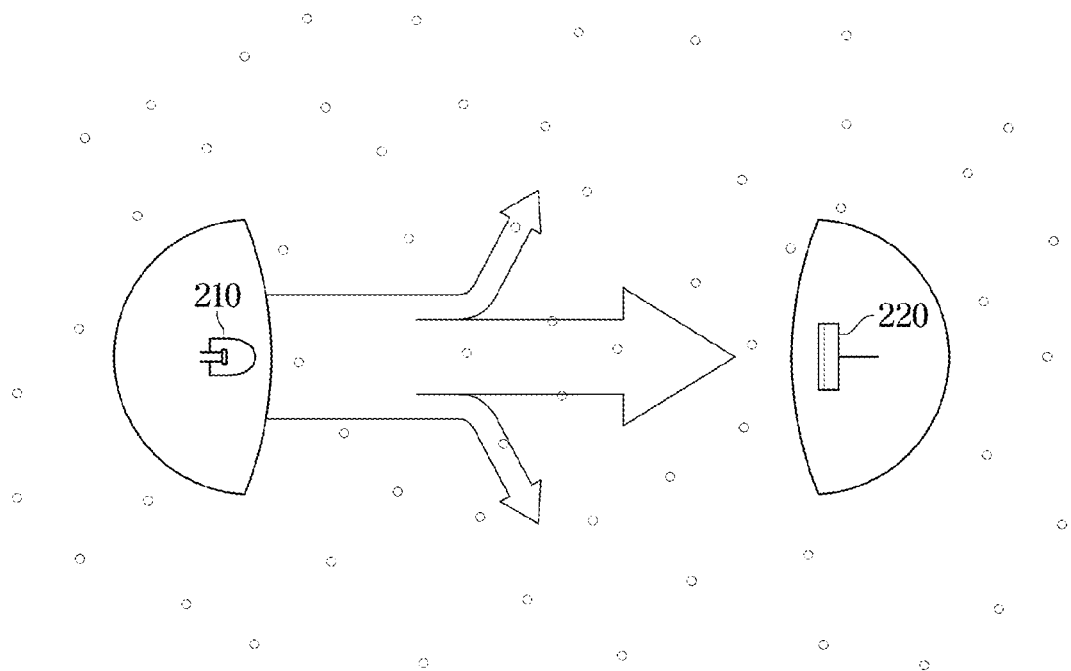

FIG. 1 is a view illustrating an appearance of a washing machine according to an embodiment. FIG. 2 is a view illustrating a side cross-sectional view of a washing machine according to an embodiment. FIG. 3 is a view illustrating a configuration of a washing machine according to an embodiment. FIGS. 4 and 5 are views illustrating an operation of an optical sensor included in a washing machine according to an embodiment.

A washing machine 100 may refer to an apparatus for washing laundry by supplying water and a detergent to a drum accommodating the laundry to be washed, and rotating the drum. Here, the laundry may include all objects that can be washed by mechanical and chemical actions. For example, the laundry includes things implemented with various types of fibers and fabrics, such as clothes and towels, and there is no limitation.

Referring to FIGS. 1 to 5, the washing machine 100 may include a rectangular parallelepiped cabinet 101. The cabinet 101 may include a base plate 102, a front cover 103, a top cover 104, and a side-rear cover 105.

The front cover 103 of the cabinet 101 may be provided with an opening 103a formed in a substantially circular shape when viewed from a front side of the washing machine 100.

A door 106 may open or close the opening 103a, and the door 106 may be rotatably fixed to one side of the cabinet 101 by a door hinge 106a. The door 106 may rotate about the door hinge 106a between a closed position that closes the opening 103a and an open position that opens the opening 103a.

The door hinge 106a may be fixed to a left side of the opening 103a, or may be fixed to a right side of the opening 103a. The door 106 may be provided to rotate around the left side of the opening 103a or may be provided to rotate around the right side of the opening 103a, depending on a position where the door hinge 106a is installed.

When the door 106 is closed, at least a part of the door 106 may be made of a transparent material so that the user can see the washing machine 100.

A control panel 110 for interacting with a user may be provided on an upper end of the front cover 103.

The control panel 110 may be provided with a dial 111 capable of receiving a user input by rotation, a button 112 capable of receiving the user input by a translational movement, and a display 113 displaying an operating state of the washing machine 100.

The user may select any one of a plurality of washing courses by rotating the dial 111. The washing machine 100 may include, for example, a plurality of different laundry courses for washing different types of laundry. Different washing courses may include different washing times, different number of rinsing, and different dehydrating times.

The button 112 may include a washing button for adjusting the washing time for the washing machine 100 to wash the laundry, a rinsing button for adjusting the number of rinsing for the washing machine 100 to rinse the laundry, and a dehydrating button for adjusting the dehydrating time for the washing machine 100 to dehydrate the laundry. In addition, the button 112 may include a power button for allowing or blocking a power supplied from an external power source, and an operating button for starting or stopping the operation of the washing machine 100.

The dial 111 and the button 112 may transmit an electrical signal (voltage or current) corresponding to the user input to a controller 170 in response to the user input received from the user.

The display 113 may display the operating state of the washing machine 100 and a control command from the user. For example, the display 113 may display a washing course selected by the user and display the time remaining until the end of washing during operation of the washing machine 100.

The display 113 may include a light emitting diode (LED) panel, an organic light emitting diode (OLED) panel, a liquid crystal display (LCD) panel, or the like.

The display 113 may also employ a touch screen panel (TSP) configured to receive the control command from the user and display operational information corresponding to the received control command.

As such, the display 113 may receive a display control signal from the controller 170 and display an image corresponding to the display control signal.

The washing machine 100 may include a tub 120 for accommodating water for washing and/or rinsing. The tub 120 may be installed so as to vibrate in the cabinet 101. The tub 120 may be fixed to the cabinet 101 through a damper 107. The damper 107 may reduce a magnitude of vibration transmitted from the tub 120 to the cabinet 101 when the tub 120 vibrates.

The tub 120 may be formed in an approximately cylindrical shape. The tub 120 may include a front portion 121 having an inlet 121*a* formed therein to allow the laundry to be put in the drum 130, and a rear portion 122 through which a rotating shaft 135*a* of a drum motor 135 passes.

The washing machine 100 may include a drum 330 to accommodate an object to be washed and wash the object to be washed. The drum 130 may be installed to be rotatable in the tub 120.

The drum 130 may be formed in a cylindrical shape whose center of rotation is formed in the front-rear, horizontal directions. A front panel 131 having an inlet 131*a* formed therein to allow the object to be washed into the drum 130 may be disposed at a front surface of the drum 130. In addition, a rear surface of the drum 330 may be closed by a rear panel 132 connected to the rotating shaft 135*a* of the drum motor 135.

The drum 130 may have a through hole 130*a* formed therein to allow introduction of the water stored in the tub 120 the drum 130. In addition, a lifter 130*b* for lifting the laundry during rotation of the drum 130 may be provided on an inner surface of the drum 130.

The drum motor 135 may be provided at the rear of the tub 120 to provide a rotational force to the drum 130. The drum motor 135 may be connected to the rear panel 132 of the drum 130 through the rotating shaft 135*a* penetrating the rear portion 122 of the tub 120. The drum motor 135 may provide the rotational force to the drum 130 through the rotating shaft 135*a*.

The drum motor 135 may rotate the drum 130 in a first direction (for example, a clockwise direction when viewed from the front of the washing machine) or in a second direction (for example, a counterclockwise direction when viewed from the front of the washing machine) in response to a motor control signal from the controller 170.

The drum motor 135 may rotate the drum 130 at a first speed (e.g., 60 rpm or less) or at a second speed (e.g., 1000 rpm or more) in response to the motor control signal from the controller 170.

A detergent compartment 141 configured to store a detergent may be provided at an upper side of the tub 120. The detergent compartment 141 may be connected to the tub 120 through a connection tube 142. The water and the detergent may be supplied to the tub 120 through the connection tube 142.

A water supply tube 152 configured to connect an external water supply and the detergent compartment 141 to each other may be provided at the upper side of the tub 120. A water supply valve 151 configured to close or open the water supply tube 152 may be installed in the water supply tube 152.

The water supply valve 151 may close or open the water supply tube 152 in response to a water supply control signal from the controller 170. In response to opening of the water supply valve 151, the water moves to the detergent compartment 141 through the water supply tube 152 and is mixed with the detergent in the detergent compartment 141. The mixture of the water and the detergent may be supplied to the tub 120 through the connection tube 142.

A drain hole 120*a* for discharging the water out of the tub 120 is formed at a bottom of the tub 120, and the drain hole 120*a* may be connected to a drain tube 162 for guiding the water of the tub 120 to the outside. A drain pump 161 that pumps the water from the tub 120 to the outside may be installed on the drain tub 162. The drain pump 161 may discharge the water stored in the tub 120 to the outside in response to a drainage control signal from the controller 170.

An optical sensor 200 for measuring a turbidity or a cleanliness of the water may be provided on a lower part of the tub 120. The turbidity may refer to a degree of turbidity of water due to particles floating in the water, and the cleanliness may indicate a degree of cleanliness of the water. For example, the water in the tub 120 may become cloudy due to particles separated from the laundry during the washing.

The turbidity may have an inverse relationship with the cleanliness.

The optical sensor 200 may measure the cleanliness of the water or the turbidity of the water stored in the tub 120 based on a transmittance of light.

The optical sensor 200 may include a light emitting element 210 that emits the light and a light receiving element 220 that receives the light emitted from the light emitting element 210. The light emitting element 210 may include a light emitting diode (LED) capable of emitting the light having a specific wavelength when the power is supplied. Further, the light receiving element 220 may include a photo diode (PD) that receives the light and outputs the electrical signal (voltage or current) corresponding to an intensity of the received light.

The light emitting element 210 may emit the light of a predetermined intensity toward the light receiving element 220 in response to a control signal from the controller 170.

The light emitting element 210 may emit a white light. The white light may be formed by mixing light having various wavelengths. For example, the white light may be formed by mixing light having a peak intensity at a wavelength indicating blue (hereinafter referred to as 'blue light'), light having a peak intensity at a wavelength indicating green (hereinafter referred to as 'green light'), and light having a peak intensity at a wavelength indicating red (hereinafter referred to as 'red light') and infrared light, or by mixing blue light and yellow light.

A spectrum of white light may have peaks at a plurality of wavelengths. For example, the spectrum of white light may have peaks at a wavelength indicating the blue, a wavelength indicating the green, and a wavelength indicating the red. In addition, the spectrum of white light may have peaks at the wavelength indicating the blue and the wavelength indicating yellow.

The light emitted from the light emitting element 210 may be scattered by particles floating in water in the tub 120. The light scattered by the particles floating in the water deviates from a path of light, and the scattered light does not propagate toward the light receiving element 220 as illustrated in FIGS. 4 and 5.

An amount (or intensity) of light scattered by particles floating in the water may depend on a concentration of particles floating in the water. For example, as illustrated in FIG. 4, the greater the concentration of particles floating in the water, the greater the amount (or intensity) of scattered light. Thereby, the intensity of light reaching the light receiving element 220 may be reduced. On the other hand, as illustrated in FIG. 5, the smaller the concentration of particles floating in the water, the smaller the amount (or intensity) of scattered light. Thereby, the intensity of light reaching the light receiving element 220 may be increased.

The light receiving element 220 may be provided at a position facing the light emitting element 210. The light receiving element 220 may receive light transmitted from the light emitting element 210 and passed through the water stored in the tub 120.

The light receiving element 220 may output the electrical signal (voltage or current) to the controller 170 in response to receiving the light. The magnitude of the electrical signal (voltage or current) output from the light receiving element 220 may depend on the intensity of the received light. For example, as the intensity of light received by the light receiving element 220 increases, the electrical signal output from the light receiving element 220 may increase. Also, as the intensity of light received by the light receiving element 220 decreases, the electrical signal output from the light receiving element 220 may decrease.

As described above, the greater the concentration of particles floating in the water (the greater the turbidity or the smaller the cleanliness), the smaller the intensity of light reaching the light receiving element 220. Thereby, the electrical signal output by the light receiving element 220 may be reduced. Also, the smaller the concentration of the particles floating in the water (the smaller the turbidity or the greater the cleanliness), the greater the intensity of light reaching the light receiving element 220. Thereby, the electrical signal output by the light receiving element 220 may be increased.

The configuration of the light emitting element 210 and the light receiving element 220 will be described in more detail below.

As such, the magnitude of the electrical signal output by the light receiving element 220 is inversely proportional to the turbidity and may be proportional to the cleanliness. The controller 170 may receive the electrical signal from the light receiving element 220 and identify the turbidity of water or the cleanliness of water stored in the tub 120 based on the magnitude of the electrical signal.

As illustrated in FIG. 3, the controller 170 may be electrically connected to the dial 111, the button 112, the display 113, the drum motor 135, the water supply valve 151, the drain pump 161, and the optical sensor 200. The controller 170 may receive electrical signals from the dial 111, the button 112 and the optical sensor 200, and may output the control single to the display 113, the drum motor 135, the water supply valve 151, and the drain pump 161.

The controller 170 may include a processor 171 for generating the control signal for controlling the operation of the washing machine 100, and a memory 172 for memorizing or storing a program and data for generating the control signal for controlling the operation of the washing machine 100. The processor 171 and the memory 172 may be implemented as separate chips or as a single chip. In addition, the controller 170 may include a plurality of processors or a plurality of memories.

The processor 171 may process data and/or signals according to a program provided from the memory 172, and generate the control signal to each component of the washing machine 100 based on a processing result.

The processor 171 may process, for example, data representing the user input output from the dial 111 and the button 112 and data representing the turbidity or the cleanliness of water output from the optical sensor 200. In addition, the processor 171 may generate the motor control signal for controlling the drum motor 135, the water supply control signal for controlling the water supply valve 151, and the drainage control signal for controlling the drain pump 161.

For example, the processor 171 may identify the washing course according to the user input. The processor 171 may determine a rotational speed and an operation period (e.g., on time and off time) of the drum 130 depending on the identified washing course, and may output the motor control signal corresponding to the determined rotational speed and operation period to the drum motor 135.

In addition, the processor 171 may adjust the washing time and/or the rinsing time based on the electrical signal of the optical sensor 200. When the turbidity of water indicated by the electrical signal of the optical sensor 200 is small (when the cleanliness of water is large), the processor 171 may reduce the washing time and/or the rinsing time. When the turbidity of water indicated by the electrical signal of the optical sensor 200 is large (when the cleanliness of water is small), the processor 171 may increase the washing time and/or the rinsing time.

The processor 171 may include an operation circuit, a memory circuit, and a control circuit. The processor 171 may include one chip or may include a plurality of chips. In addition, the processor 171 may include one core or may include a plurality of cores.

The memory 172 may store or store programs and data for controlling the operation of the washing machine 100 according to the washing course. For example, the memory 172 may memorize or store the rotational speed of the drum 130 according to the washing course and the washing time/the number of rinsing/the dehydrating time according to the washing course.

In addition, the memory 172 may store user inputs received through the dial 111 and the button 112, or information about the operation of the washing machine 100 (for example, a current process, the time remaining until the operation of the washing machine is completed.

The memory 172 may include a volatile memory such as Static Random Access Memory (S-RAM) and Dynamic Random Access Memory (D-RAM), and a non-volatile memory such as Read Only Memory (ROM) and Erasable Programmable Read Only Memory (EPROM). The memory 172 may include one memory element or a plurality of memory elements.

The memory 172 may include one memory element or may include a plurality of memory elements.

Figure 6:
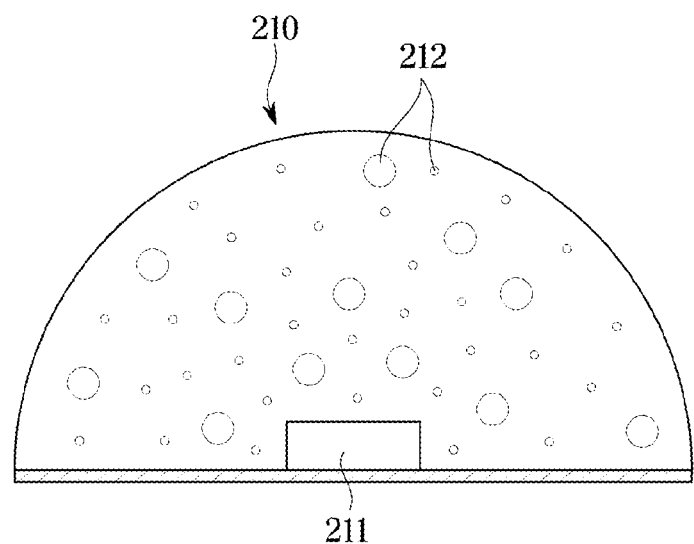
FIG. 6 is a view illustrating a configuration of a light emitting element included in a washing machine according to an embodiment.
Figure 7:
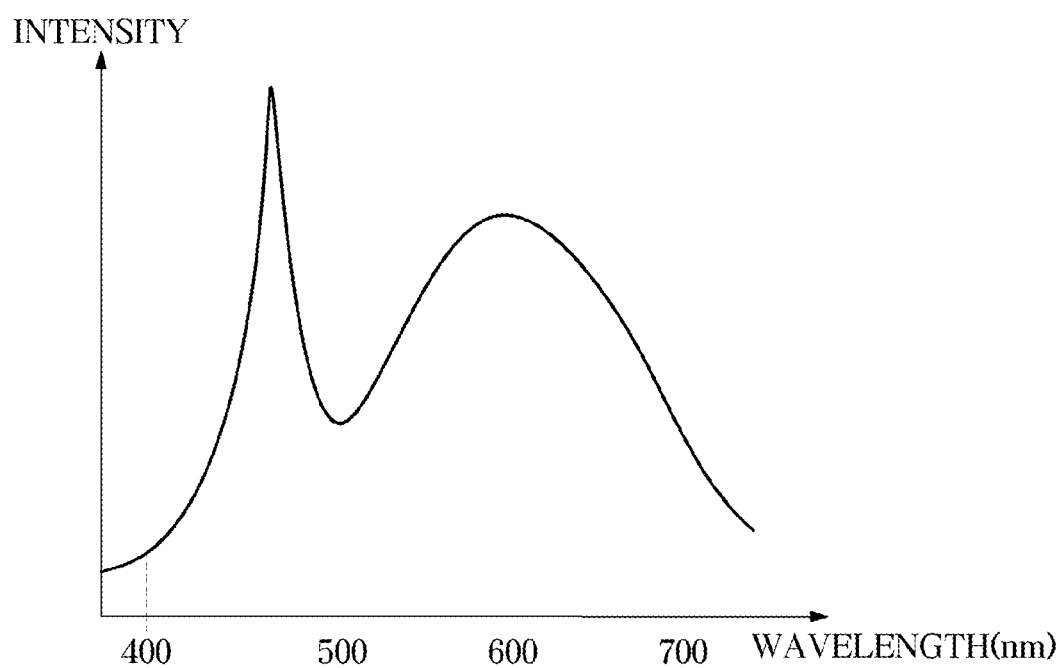
FIG. 7 is a view illustrating an example of a spectrum of light emitted from a light emitting device included in a washing machine according to an embodiment.
Figure 8:
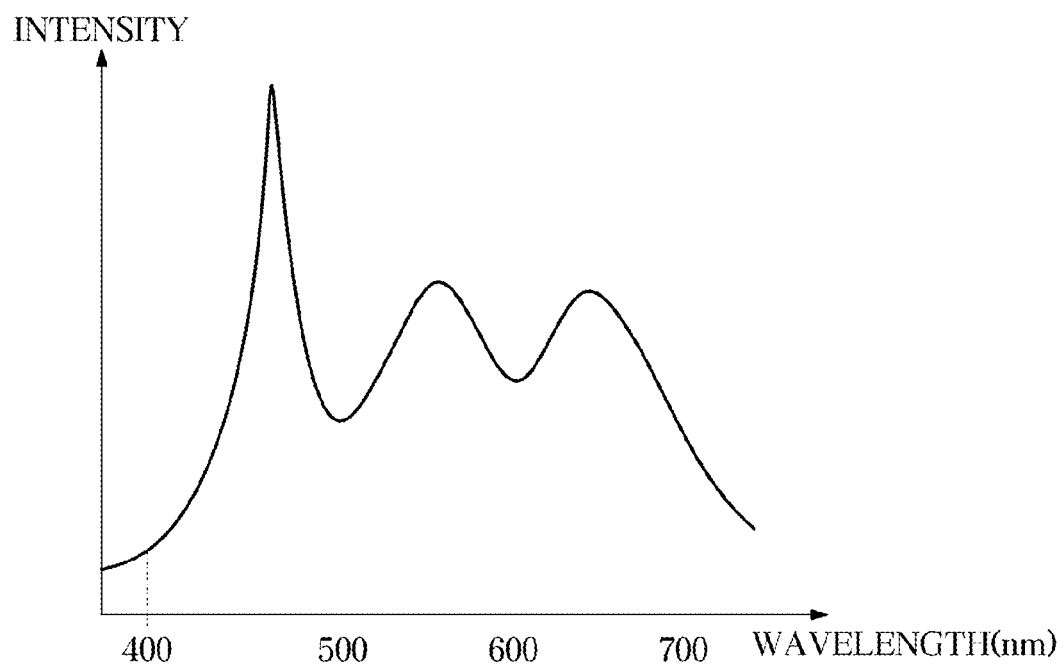
FIG. 8 is a view illustrating another example of a spectrum of light emitted from a light emitting device included in a washing machine according to an embodiment.

FIG. 6 is a view illustrating a configuration of a light emitting element included in a washing machine according to an embodiment. FIG. 7 is a view illustrating an example of a spectrum of light emitted from a light emitting device included in a washing machine according to an embodiment. FIG. 8 is a view illustrating another example of a spectrum of light emitted from a light emitting device included in a washing machine according to an embodiment.

Referring to FIGS. 6 to 8, the light emitting element 210 may include a light emitting diode 211 that emits light having a first wavelength, and a phosphor 212 that absorbs light having the first wavelength emitted from the light emitting diode 211 and emits light having a third wavelength different from a second wavelength.

The light emitting diode 211 may emit blue light or ultraviolet rays, for example.

The light emitting diode 211 may be manufactured from an indium-gallium-nitrogen compound (InGaN) obtained by adding indium (In) to a gallium-nitrogen compound (GaN). Particularly, the light emitting diode 211 may be manufactured by a p-n junction between an n-type semiconductor in which a donor material is added to the indium-gallium-nitrogen compound (InGaN) and a p-type semiconductor in which an acceptor material is added to the indium-gallium-nitrogen compound (InGaN).

The gallium-nitrogen compound (GaN) may have an energy band gap of approximately 3.4 eV, and a light emitting diode composed of the gallium-nitrogen compound (GaN) may emit near-ultraviolet rays having a wavelength of approximately 365 nm. In addition, the indium-nitrogen compound (InN) may have an energy band gap of approximately 0.8 eV, and the light emitting diode composed of the indium-nitrogen compound (InN) may emit an infrared ray having a wavelength of approximately 1550 nm.

At this time, when the indium (In) is added to the gallium-nitrogen compound (GaN), the energy band gap of the indium-gallium-nitrogen compound (InGaN) may vary from approximately 3.4 eV to 0.8 eV depending on an addition ratio of the indium (In). The light emitting diode composed of the indium-gallium-nitrogen compound (InGaN) in which a ratio between contained gallium (Ga) and indium (In) is approximately 0.85:0.15 may emit blue light having a wavelength of approximately 450 nm.

The phosphor 212 may be an inorganic luminescence material that absorbs energy such as light or heat from the outside, converts the absorbed energy into visible light, and emits the converted visible light.

For example, the phosphor may be manufactured by adding active ions that directly play a role in light emission to base materials such as garnets, silicates, sulfides, oxy-nitrides, nitrides. Here, europium (Eu) ions or cerium (Ce) are widely used as the active ions.

For example, when the europium ions are added to sulfides or nitrides, the phosphor 212 may emit red and green light. In this way, the phosphor 212 that emits red and green light may be called a red/green (RG) phosphor. However, the red/green phosphor does not emit only red light and green light, but may also emit yellow light or orange light having a wavelength between a wavelength of green light and a wavelength of red light. In addition, when the cerium ions are added to the garnets (Y3Al5O12:YAG or Tb3Al5O12:TAG), the phosphor 212 may emit the yellow light. In this way, the phosphor 212 that emits the yellow light may be called a yellow phosphor.

The phosphor 212 may absorb a part of the blue light emitted from the light emitting diode 211 and transmit the remaining part. In addition, the phosphor 212 may convert the absorbed blue light into red and green and emit it according to its type (in the case of red/green phosphor), or may convert it into yellow and emit it (in the case of yellow phosphor).

When the light emitting element 210 includes the yellow phosphor, the light emitting element 210 may emit the blue light and the yellow light. As such, the light emitted from the light emitting element 210 including the yellow phosphor may have peaks at the wavelength representing blue and the wavelength representing yellow, as illustrated in FIG. 7. In other words, the light emitting element 210 including the yellow phosphor may emit white light in which light having the peak intensity at the wavelength representing the blue and light having the peak intensity at the wavelength representing the yellow are mixed.

As illustrated in FIG. 7, the light emitted from the light emitting element 210 is not limited to the blue light and the yellow light. For example, the light emitting element 210 may emit the green light, the red light, and the infrared ray. However, the intensity of each of the green light, the red light, and the infrared ray may be less than the intensity that of the blue light and the yellow light.

When the light emitting element 210 includes the red/green phosphor, the light emitting element 210 may emit the blue light, the green light, and the red light. As such, the light emitted from the light emitting element 210 including the red/green phosphor may have peaks at the wavelength representing the blue, the wavelength representing the green, and the wavelength representing the red, as illustrated in FIG. 8. In other words, the light emitting element 210 including the red/green phosphor may emit the white light in which the light having the peak intensity at the wavelength representing the blue, the light having the peak intensity at the wavelength representing the green, and the light having the peak intensity at the wavelength representing the red are mixed.

As illustrated in FIG. 8, the light emitted from the light emitting element 210 is not limited to the blue light, the green light, and the red light. For example, the light emitting element 210 may emit the infrared ray. However, the intensity of each of the infrared ray may be less than the intensity that of the blue light, the green light, and the red light.

Figure 9:
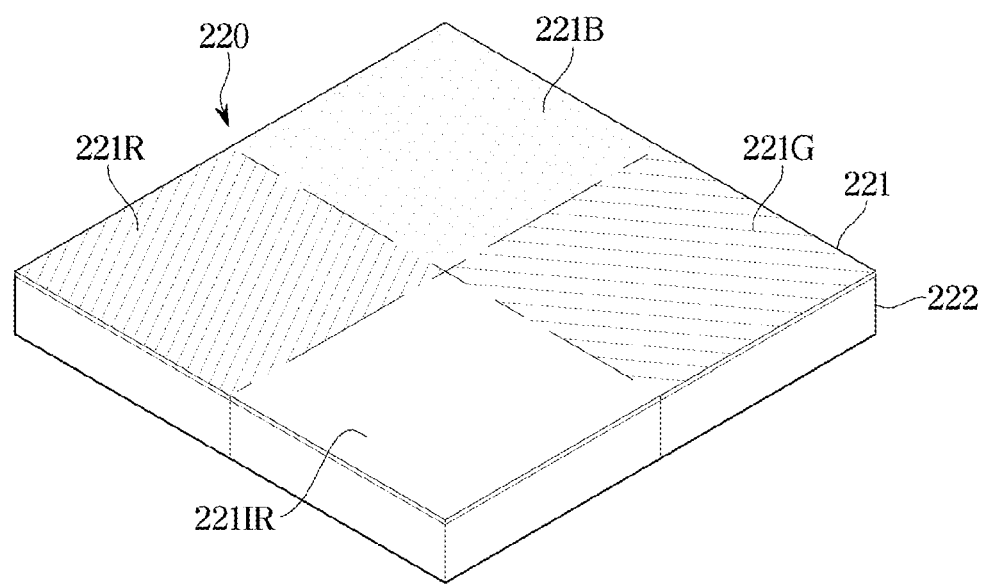
FIG. 9 is a view illustrating an example of a light receiving element included in a washing machine according to an embodiment.
Figure 10:
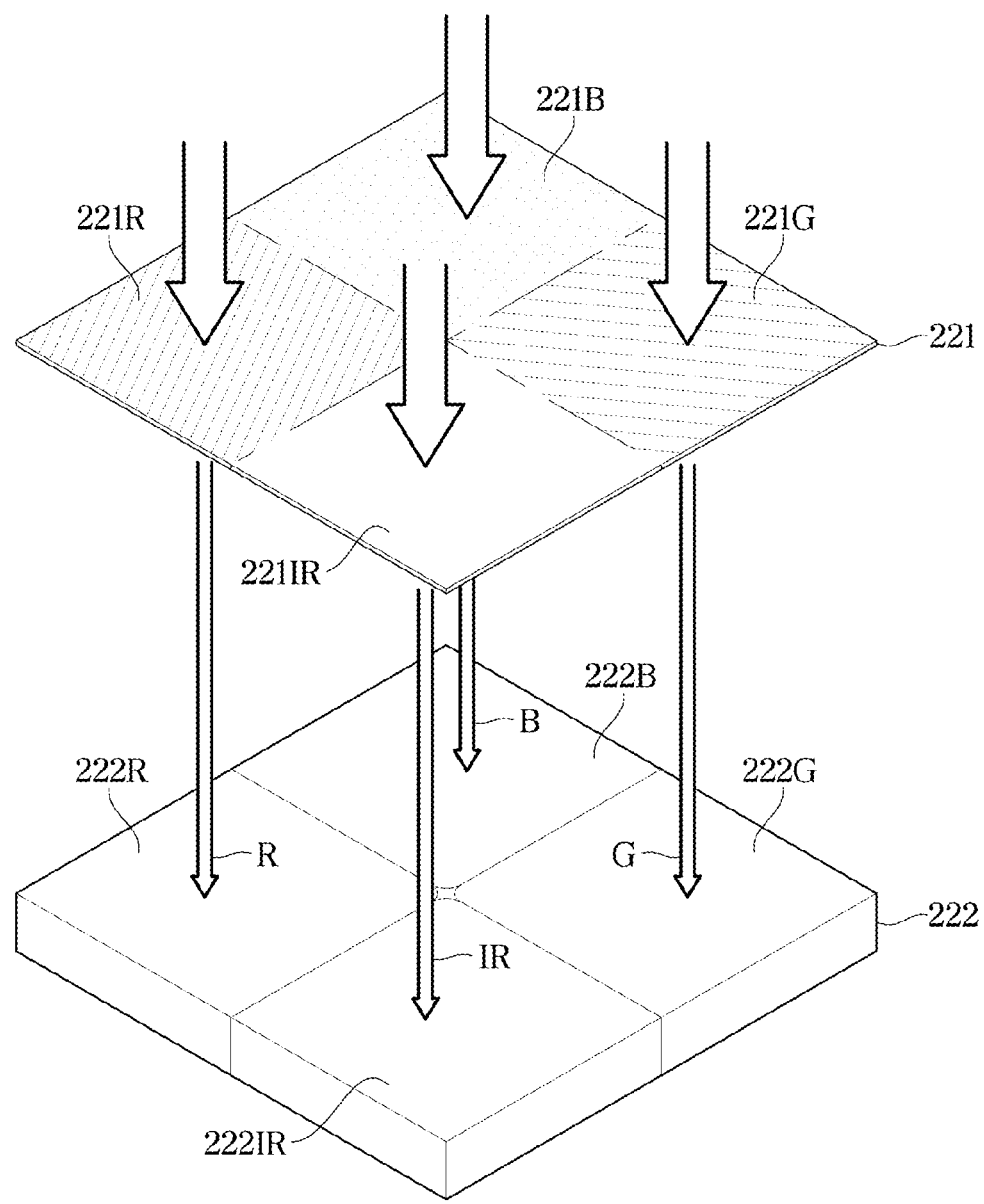
FIG. 10 is a view illustrating an exploded view of the light receiving device illustrated in FIG. 9.
Figure 11:
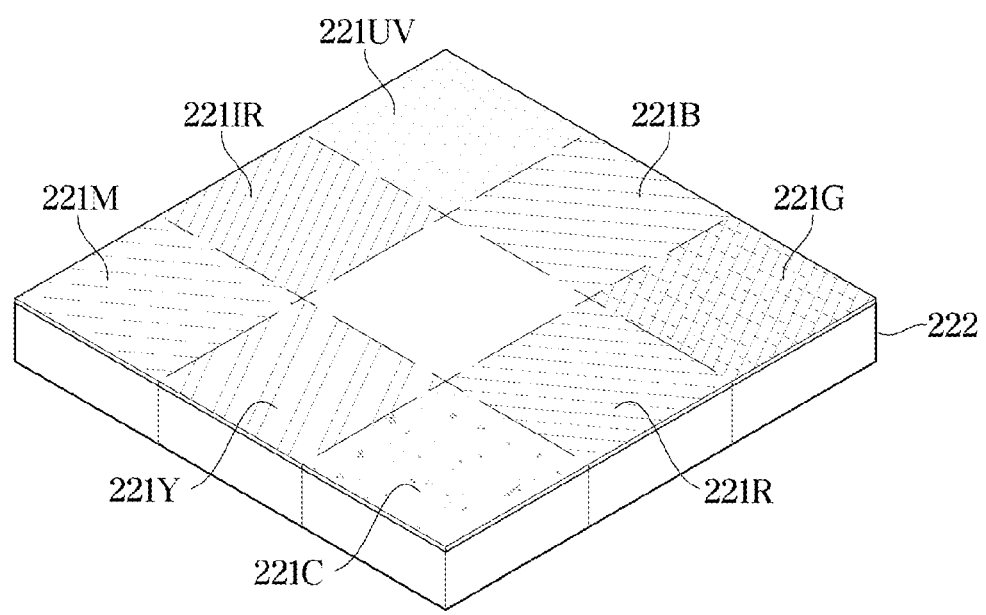
FIG. 11 is a view illustrating another example of a light-receiving element included in a washing machine according to an embodiment.

FIG. 9 is a view illustrating an example of a light receiving element included in a washing machine according to an embodiment. FIG. 10 is a view illustrating an exploded view of the light receiving device illustrated in FIG. 9. FIG. 11 is a view illustrating another example of a light-receiving element included in a washing machine according to an embodiment.

Referring to FIGS. 9 and 10, the light receiving element 220 may include a filter array 221 that selectively passes light having a predetermined wavelength range, and a photodiode array 222 that receives the light and outputs the electrical signal (voltage or current) in response to the receiving the light.

The filter array 221 may include a blue filter 221B that selectively passes the blue light and blocks other light, a green filter 221G that selectively passes the green light and blocks other light, a red filter 221R that selectively passes the red light and blocks other light, and an infrared filter 221I8 that selectively passes the infrared ray and blocks other light.

The blue filter 221B, the green filter 221G, the red filter 221R, and the infrared filter 221IR constituting the filter array 221 may be located on the same plane.

The filter array 221 may be manufactured by applying a dye on tempered glass or transparent plastic using dyeing, printing, or electro-deposition.

The filter array 221 illustrated in FIGS. 9 and 10 may include, but is not limited to, color filters 221B, 221G, 221R, and 221IR that selectively pass the blue light, the green light, the red light, and the infrared ray. For example, as illustrated in FIG. 11, the filter array 221 may include an ultraviolet filter 221UV that selectively passes the ultraviolet rays, the blue filter 221B that selectively passes the blue light, the green filter 221G that selectively passes the green light, the red filter 221R that selectively passes the red light, a cyan filter 221C that selectively passes cyan light, a yellow filter 221Y that selectively passes the yellow light, a magenta filter 221M that selectively passes magenta light, and the infrared filter 221IR that selectively passes the infrared ray.

The photodiode array 222 may include a plurality of photodiodes 222B, 222G, 222R, and 222IR located on the same plane. The photodiode array 222 may include a first photodiode 222B, a second photodiode 222G, a third photodiode 222R, and a fourth photodiode 222IR.

Each of the first, second, third, and fourth photodiodes 222B, 222G, 222R, and 222IR may receive the light and output the electrical signal (voltage or current) in response to the receiving the light. Particularly, the first, second, third, and fourth photodiodes 222B, 222G, 222R, and 222IR may output a voltage or a current having a value depending on the intensity of the received light. For example, as the intensity of the received light increases, the value of the voltage or the current output from each of the first, second, third, and fourth photodiodes 222B, 222G, 222R, and 222IR may increase. Also, as the intensity of the received light decreases, the value of the voltage or the current output from each of the first, second, third, and fourth photodiodes 222B, 222G, 222R, and 222IR may decrease.

At least a portion of the first photodiode 222B, the second photodiode 222G, the third photodiode 222R, and the fourth photodiode 222IR may overlap with the blue filter 221B, the green filter 221G, the red filter, and the infrared filter 221IR, respectively.

Accordingly, the first photodiode 222B, the second photodiode 222G, the third photodiode 222R, and the fourth photodiode 222IR may receive the light that has passed through the blue filter 221B, the green filter 221G, the red filter 221R, and the infrared filter 221IR. As illustrated in FIG. 10, the first photodiode 222B may receive the blue light that has passed through the blue filter 221B. The second photodiode 222G may receive the green light that has passed through the green filter 221G. The third photodiode 222R may receive the red light that has passed through the red filter 221R. The fourth photodiode 222IR may receive the infrared ray that have passed through the infrared filter 221IR.

The first photodiode 222B may output the electrical signal (voltage or current) depending on the intensity of blue light among the light incident on the photodiode array 222 to the controller 170. The second photodiode 222G may output the electrical signal (voltage or current) depending on the intensity of green light among the light incident on the photodiode array 222 to the controller 170. The third photodiode 222R may output the electrical signal (voltage or current) depending on the intensity of red light among the light incident on the photodiode array 222 to the controller 170.

The fourth photodiode 222IR may output the electrical signal (voltage or current) depending on the intensity of infrared ray among light incident on the photodiode array 222 to the controller 170.

The first, second, third, and fourth photodiodes 222B, 222G, 222R, 222IR may be formed of the p-n junction of the n-type semiconductor and the p-type semiconductor, respectively, and may generate the current depending on the intensity of the incident light due to a photovoltaic effect.

The photodiodes 222B, 222G, 222R, and 222IR may be formed of silicon (Si), germanium (Ge), and an indium-gallium-arsenic compound (InGaAs). The silicon (Si) has an energy band gap of 1.12 eV, and may measure the intensity of light having a wavelength between approximately 190 nm and 1100 nm. The germanium (Ge) has an energy band gap of 0.67 eV, and may measure the intensity of light having a wavelength between approximately 800 nm and 1700 nm. In addition, the indium-gallium-arsenic compound (InGaAs) may measure the intensity of light having a wavelength between approximately 800 nm and 2600 nm depending on the ratio of the indium (In) and the gallium (Ga).

The photodiode array 222 illustrated in FIGS. 9 and 10 includes, but is not limited to, four photodiodes 222B, 222G, 222R, and 222IB. For example, the photodiode array 222 may include 8 photodiodes as illustrated in FIG. 11.

As such, the light receiving element 220 may output an electrical signal indicating the intensity of light having a plurality of different wavelengths.

For example, the light receiving element 220 may output electrical signals (voltage or current) each representing the intensity of blue light, green light, red light, and infrared ray among light incident on the light receiving element 220.

The controller 170 may receive the electrical signal from the light receiving element 220. The controller 170 may receive the electrical signal of the first photodiode 222B, the electrical signal of the second photodiode 222G, the electrical signal of the third photodiode 222R, and the electrical signal of the fourth photodiode 222IR.

The controller 170 may determine the color and the turbidity (or cleanliness) of water contained in the tub 120 based on the electrical signal from the light receiving element 220. In addition, the controller 170 may reduce the washing time and/or the rinsing time or increase the washing time and/or the rinsing time depending on the color and the turbidity (or cleanliness) of water contained in the tub 120. In other words, the controller 170 may reduce the washing time and/or the rinsing time or increase the washing time and/or the washing time depending on the electrical signals of the first, second, third, and fourth 222B, 222G, 222R, and 222IR.

As described above, the light emitting element 210 may transmit the white light including the blue light, the green light, the red light, and the infrared ray, and the light receiving element 220 may transmit a received intensity of each of the blue light, the green light, the red light, and the infrared ray. In other words, the optical sensor 200 may measure the transmittance (or scattering rate) of the blue light, the green light, the red light, and the infrared ray on a single optical path.

Accordingly, a reliability of the transmittance (or scattering rate) of the blue light, the green light, the red light, and the infrared ray measured by the optical sensor 200 may be improved, and a structure of the optical sensor 200 may be simplified.

The degree of scattering of light passing through the water may depend on not only the concentration of the particles floating in the water, but also the wavelength of light, a size of the particles floating in the water, and a color of the particles floating in the water.

Figure 12:
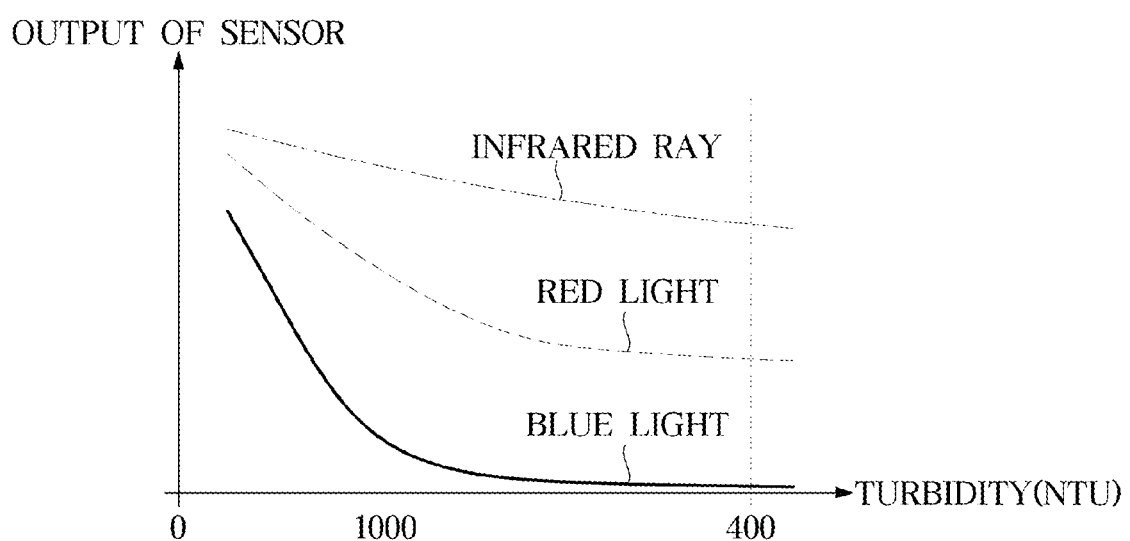
FIG. 12 is a view illustrating a relationship between an output of an optical sensor included in a washing machine and a turbidity according to an embodiment.

FIG. 12 is a view illustrating a relationship between an output of an optical sensor included in a washing machine and a turbidity according to an embodiment. Particularly, FIG. 12 illustrates a relationship between the turbidity of particles floating in the water and the magnitude of the electrical signal of the light receiving element 220 according to the wavelength of light. In this case, it is assumed that the size of the particles floating in the water and the color of the particles floating in the water are the same.

As illustrated in FIG. 12, as the turbidity of particles floating in the water increases, the magnitude of the electrical signal output from the light receiving element 220 may decrease.

As illustrated in FIG. 12, the degree to which the light passing through the water is scattered may depend on the wavelength of the light. When the turbidity of particles floating in the water is the same, the received intensity (transmittance) of light having a short wavelength is small.

For example, when the turbidity of water is approximately 1000 NTU, the output signal of the optical sensor 200 indicating the received intensity (transmittance) of the infrared ray is greater than the output signal of the optical sensor 200 indicating the received intensity (transmittance) of the red light. The output of the light receiving element 220 by the red light is greater than the output signal of the optical sensor 200 indicating the received intensity (transmittance) of the blue light.

In addition, the output signal of the optical sensor 200 indicating the received intensity (transmittance) of the infrared ray gradually decreases between 0 NTU and approximately 4000 NTU of the turbidity of water. On the other hand, the output signal of the optical sensor 200 representing the received intensity (transmittance) of the blue light rapidly decreases between 0 NTU and approximately 1000 NTU of the turbidity of water, and rapidly decreases a change in the output signal approximately 1000 NTU or more. Therefore, the optical sensor using the infrared ray may measure the turbidity of water between 0 NTU and approximately 4000 NTU, while the optical sensor using the blue light may measure the turbidity of water between 0 NTU and approximately 1000 NTU more accurately than the infrared ray.

The optical sensor 200 using both the infrared ray and the blue light may measure the turbidity of water in a wide range using the infrared ray, and may accurately measure the turbidity of water in a narrow range using the blue light.

Figure 13:
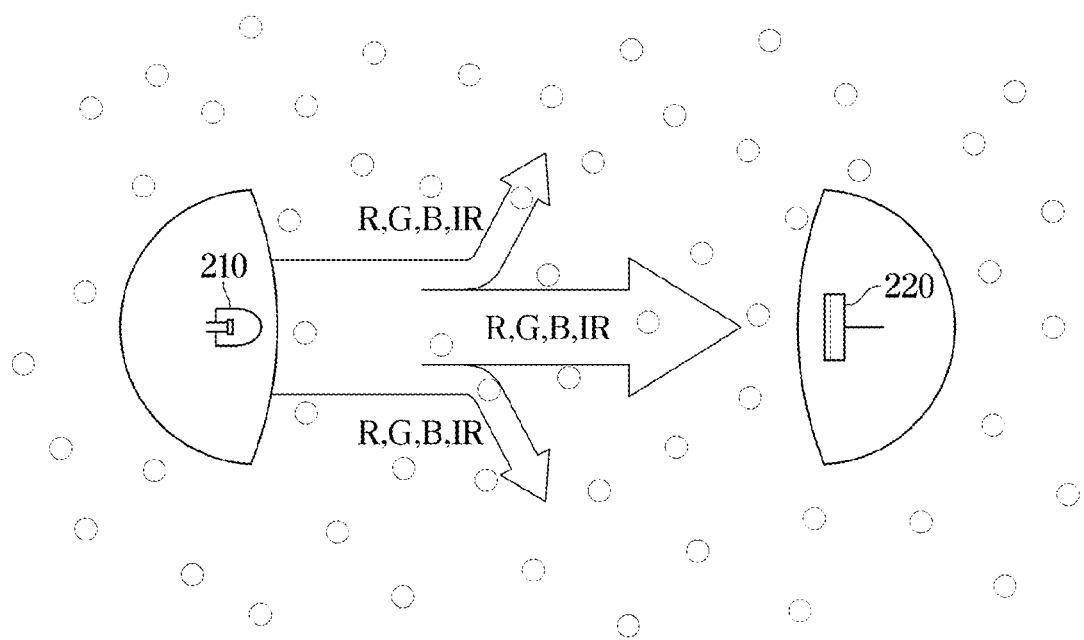
FIGS. 13 and 14 are views illustrating that light emitted from a light emitting device included in a washing machine is scattered by large particles and small particles according to an embodiment.
Figure 14:
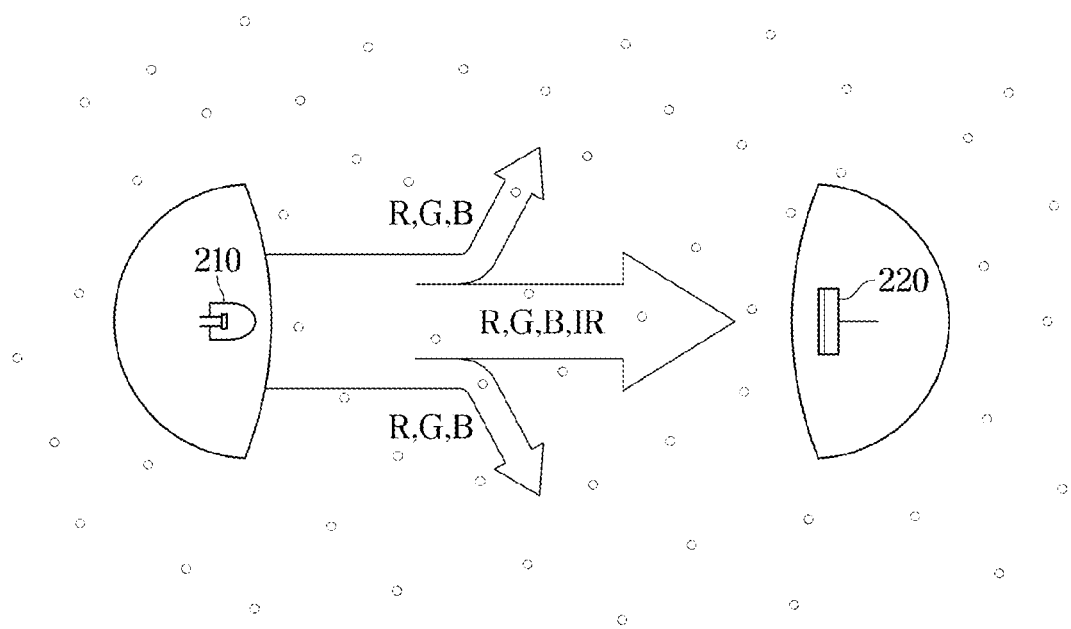

FIGS. 13 and 14 are views illustrating that light emitted from a light emitting device included in a washing machine is scattered by large particles and small particles according to an embodiment.

The degree to which the light passing through the water is scattered may depend not only on the concentration of the particles floating in the water but also on the size of the particles floating in the water.

When the size of the particles floating in the water is large, as illustrated in FIG. 13, the visible light (blue light, green light, red light) and the infrared ray may be scattered by the particles. Therefore, as the concentration of the particles increases, both the output signal of the optical sensor 200 indicating the received intensity (transmittance) of the visible light and the output signal of the optical sensor 200 indicating the received intensity (transmittance) of the infrared ray may be decreased.

When the size of the particles floating in the water is small, as illustrated in FIG. 14, the visible light (blue light, green light, red light) may be scattered by the particles, and the infrared ray may not be scattered by the particles. Accordingly, as the concentration of the particles increases, the output signal of the optical sensor 200 indicating the received intensity (transmittance) of the visible light decreases significantly, while the output signal of the optical sensor 200 indicating the received intensity (transmittance) of the infrared ray may not change significantly as the concentration of the particles increases.

Accordingly, the optical sensor using both the visible light and the infrared ray may identify the size of the particles floating in the water based on the output signal representing the received intensity (transmittance) of the visible light and the output signal representing the received intensity (transmittance) of the infrared ray.

Figure 15:
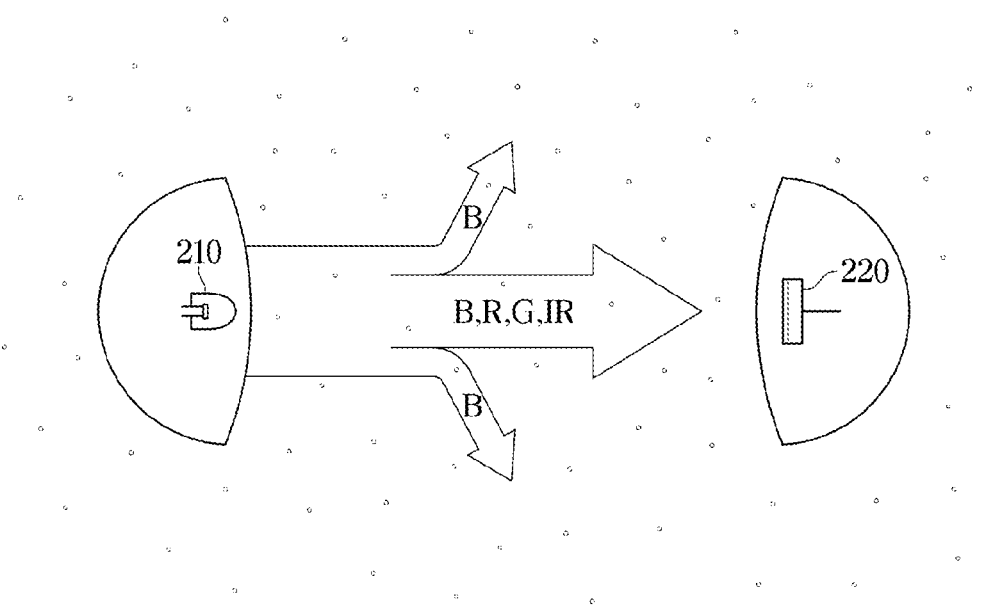
FIG. 15 is a view illustrating that light emitted from a light emitting device included in a washing machine is scattered by a dye according to an embodiment.

FIG. 15 is a view illustrating that light emitted from a light emitting device included in a washing machine is scattered by a dye according to an embodiment.

The degree of scattering of light passing through the water may depend on the optical properties of the particles floating in the water as well as the concentration of the particles floating in the water. In other words, when the dye is included in the water, light of a specific color may be scattered and the light of the specific color may be absorbed.

For example, as illustrated in FIG. 15, when the particles floating in the water contain a specific dye, the scattering rate of the blue light may increase due to the particles floating in the water. Accordingly, the output signal of the optical sensor 200 indicating the received intensity (transmittance) of the blue light may be reduced than the output signal of the optical sensor 200 indicating the received intensity (transmittance) of other light (green light, red light, infrared ray).

Accordingly, the optical sensor using both the blue light, the green light, and the red light may identify the dye floating in the water.

As described above, the optical sensor 200 using both the blue light, the green light, the red light, and the infrared ray may identify the concentration of particles floating in the water, may identify the size of particles floating in the water, and may identify the dye floating in the water.

Hereinafter, the operation of the washing machine 100 using characteristics of the optical sensor 200 will be described.

Figure 16:
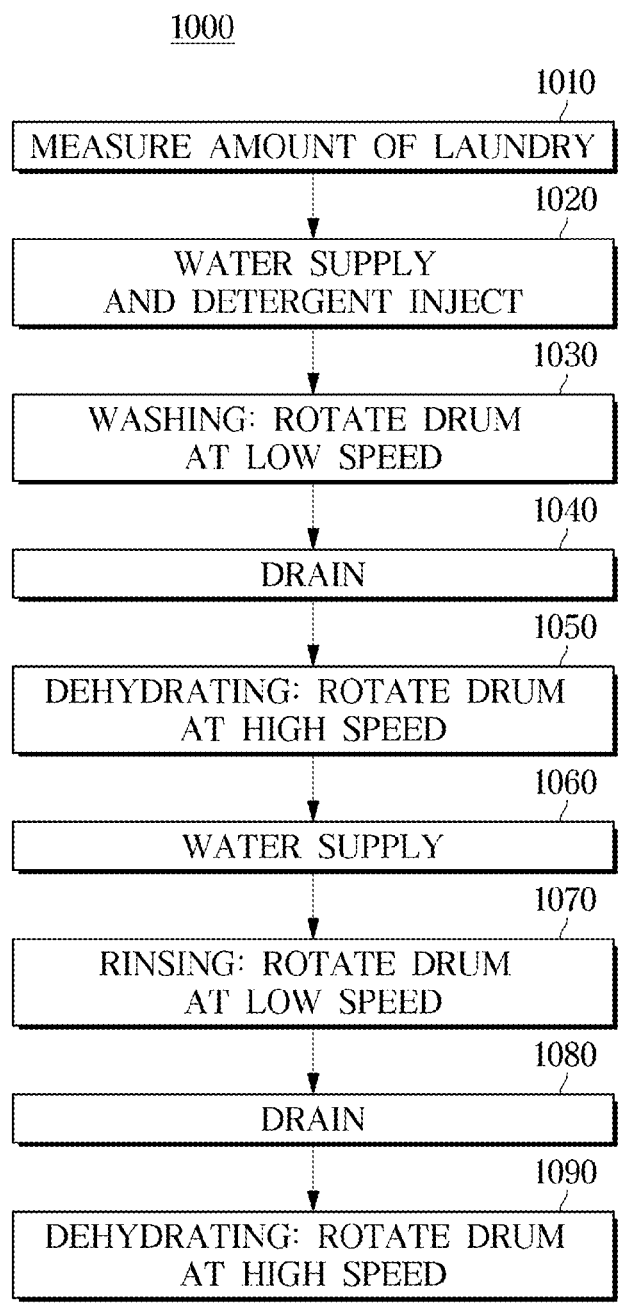
FIG. 16 is a view illustrating a washing operation of a washing machine according to an embodiment.

FIG. 16 is a view illustrating a washing operation of a washing machine according to an embodiment.

The washing machine 100 may perform a series of operations 1000 for washing the laundry.

The washing machine 100 may measure an amount of laundry (1010).

The controller 170 may control the drum motor 135 to rotate the drum 130 in a forward or reverse direction in order to measure the amount of laundry, and may measure a current supplied to the drum motor 135. Due to the increase in the amount of laundry, the current supplied to the drum motor 135 may increase.

Accordingly, the controller 170 may estimate the amount of laundry based on the current supplied to the drum motor 135.

Thereafter, the washing machine 100 may supply the water and the detergent to the tub 120 (1020).

The controller 170 may open the water supply valve 151 to supply the water to the tub 120 depending on the measured amount of laundry. By opening the water supply valve 151, the water may be supplied to the tub 120 via the detergent compartment 141. Accordingly, the detergent may be supplied to the tub 120 together with the water during a first water supply for washing.

Thereafter, the washing machine 100 may rotate the drum 130 at a low speed for washing (1030).

The controller 170 may control the drum motor 135 to rotate the drum 130 at the low speed (e.g., a rotational speed between approximately 45 rpm and 60 rpm). In addition, the controller 170 may control the drum motor 135 so that the drum 130 rotates in a first direction and rotates in a second direction alternately.

While the drum 130 rotates alternately in the first direction and the second direction, the laundry inside the drum 130 may roll along an inner wall of the drum 130 or fall from the upper side of the drum 130 after being lifted. Since the detergent is supplied to the tub 120 along with the water during the first water supply, foreign substances adhered to the laundry while the laundry rolls or falls inside the drum 130 may be separated from the laundry by a chemical action of the detergent. The laundry may be washed by a friction by falling and the chemical action by the detergent.

Thereafter, the washing machine 100 may discharge the water from the tub 120 (1040).

The controller 170 may operate the drain pump 161 so that the water of the tub 120 is discharged. The water in the tub 120 may be pumped to the outside by the drain pump 161.

Thereafter, the washing machine 100 may rotate the drum 130 at a high speed (1050).

The controller 170 may control the drum motor 135 to rotate the drum 130 at the high speed (e.g., rotational speed of approximately 1000 rpm).

While the drum 130 rotates at the high speed, the laundry inside the drum 130 may be located along the inner wall of the drum 130, and the water absorbed by the laundry may be separated from the laundry by a centrifugal force. The water separated from the laundry may pass through the through hole 130a of the drum 130 to move to the tub 120 and may be discharged to the outside through the tub 120.

Thereafter, the washing machine 100 may supply the water to the tub 120 (1050).

The controller 170 may open the water supply valve 151 to supply the water to the tub 120 depending on the measured amount of laundry. By opening the water supply valve 151, the water may be supplied to the tub 120 via the detergent compartment 141. Since the detergent contained in the detergent compartment 141 was supplied to the tub 120 by the first water supply, only the water without the detergent may be supplied to the tub 120 during water supply after the second water supply.

Thereafter, the washing machine 100 may rotate the drum 130 at the low speed for rinsing (1030).

The controller 170 may control the drum motor 135 to rotate the drum 130 at the low speed (e.g., the rotational speed between approximately 45 rpm and 60 rpm). In addition, the controller 170 may control the drum motor 135 so that the drum 130 rotates in the first direction and rotates in the second direction alternately.

While the drum 130 rotates alternately in the first direction and the second direction, the laundry inside the drum 130 may roll along the inner wall of the drum 130 or fall from the upper side of the drum 130 after being lifted. While the laundry rolls or falls inside the drum 130, the detergent and the foreign substances adhered to the laundry may be separated from the laundry together with the water. In order words, the laundry may be rinsed.

Thereafter, the washing machine 100 may discharge the water from the tub 120 (1080).

The controller 170 may operate the drain pump 161 so that the water of the tub 120 is discharged. The water in the tub 120 may be pumped to the outside by the drain pump 161.

The water for rinsing and rotation and drainage of the drum 130 may be repeated several times.

Thereafter, the washing machine 100 may rotate the drum 130 at the high speed (1090).

The controller 170 may control the drum motor 135 to rotate the drum 130 at the high speed (e.g., rotational speed of approximately 1000 rpm), and while the drum 10 rotates at the high speed, the controller 170 may discharge the water absorbed into the laundry to the outside through the tub 120.

As described above, the washing machine 100 may perform a washing process, a rinsing process, and a dehydrating process to wash the laundry. In this case, the washing process may include a first water supply, detergent injection, rotation and drainage of the drum 130. The rinsing process may include water supply after the second, rotation and drainage of the drum 130. The dehydrating process may include dehydration after the rinsing process.

The washing machine 100 may measure the turbidity or the cleanliness of water using the optical sensor 200 at predetermined times (e.g., every minute) while washing the laundry, and store the measured turbidity or cleanliness. In addition, the washing machine 100 may adjust a time of the washing process and/or a time of the rinsing process based on the measured turbidity or cleanliness for washing the laundry.

Figure 17:
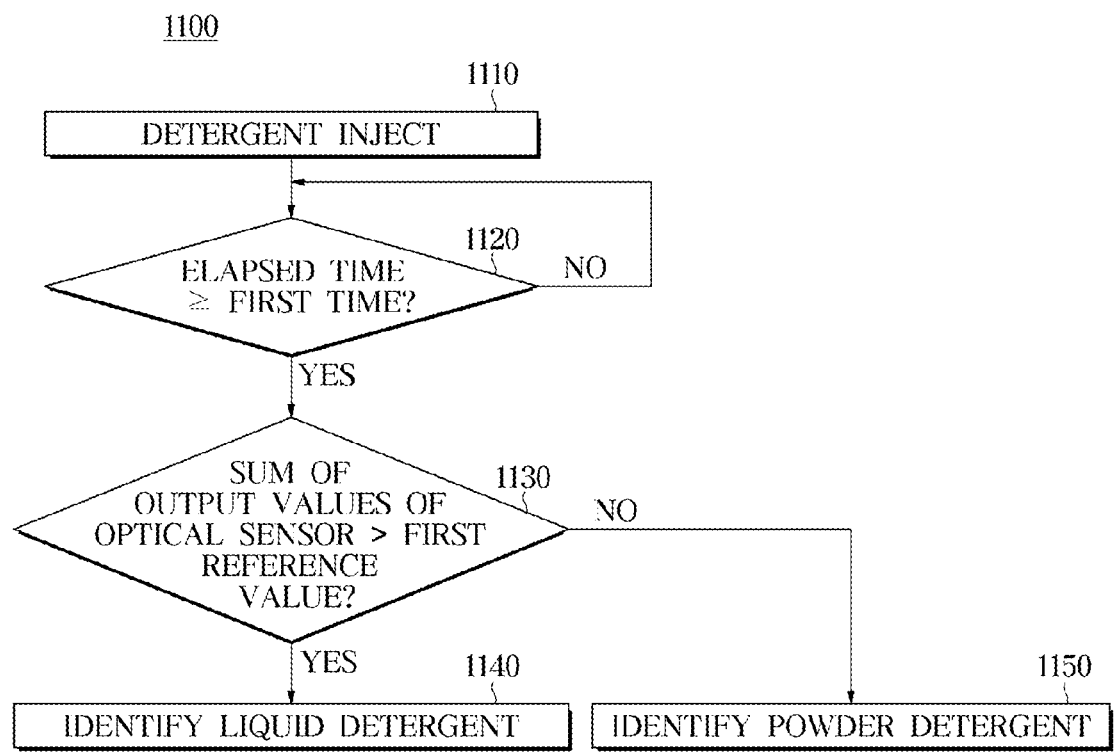
FIG. 17 is a view illustrating an operation for identifying a detergent during a washing process of a washing machine according to an embodiment.

FIG. 17 is a view illustrating an operation for identifying a detergent during a washing process of a washing machine according to an embodiment.

As illustrated in FIG. 17, the washing machine 100 may measure the cleanliness or the turbidity of water during the washing process, and may identify a type of detergent depending on the measured cleanliness or turbidity (1100).

The washing machine 100 may put the detergent into the tub 120 (1110).

The controller 170 may open the water supply valve 151 to supply the water to the tub 120. By opening the water supply valve 151, the water may be supplied to the tub 120 via the detergent compartment 141, and the detergent in the detergent compartment 141 may be supplied to the tub 120 together with the water.

The washing machine 100 may determine whether a time that has elapsed since the detergent is injected to the tub 120 is greater than or equal to a first time (1120).

The controller 170 may count the elapsed time after the detergent is injected to the tub 120. The controller 170 may compare the elapsed time with the first time.

The first time may be set experimentally or empirically. The first time may be set based on, for example, a time when the detergent injected into the tub 120 is dissolved in the water.

The first time may be variable. For example, when the amount of laundry changes, the amount of detergent to be injected is changed, and thus the first time may vary depending on the amount of laundry. The first time may increase as the amount of laundry increases, and the first time may decrease as the amount of laundry decreases.

When the elapsed time after the detergent is injected to the tub 120 is not more than the first time (NO in 1110), the washing machine 100 may continue to rotate the drum 130 for washing.

When the time that has elapsed since the detergent is injected to the tub 120 is greater than or equal to the first time (YES in 1110), the washing machine 100 may determine whether a sum of output values of the optical sensor 200 is greater than or equal to a first reference value (1130).

When the time that has elapsed since the detergent is injected to the tub 120 is greater than or equal to the first time, the washing machine 100 may be determined that the detergent injected into the tub 120 is dissolved in the water.

The controller 170 may control the optical sensor 200 to emit the white light, and may receive the electrical signal (voltage or current) output from the optical sensor 200. The controller 170 may receive the electrical signal output from the first photodiode 222B, the electrical signal output from the second photodiode 222G, the electrical signal output from the third photodiode 222R, and the electrical signal output from the fourth photodiode 22218.

The controller 170 may calculate a sum of the electrical signals output from the first, second, third, and fourth photodiodes 222B, 222G, 222R, and 2221R. In other words, the controller 170 may calculate a sum of a value representing the cleanliness (inverse proportion to turbidity) of the water measured the by the blue light, a value representing the cleanliness of the water measured by the green light, a value representing the cleanliness of the water measured by the red light, and a value representing the cleanliness of the water measured by the infrared ray.

The controller 170 may compare the sum of output values of the optical sensor 200 with the first reference value to determine the turbidity or the cleanliness of water contained in the tub 120.

The first reference value may be set experimentally or empirically. The first reference value may be set based on an intensity of light passing through water mixed with a liquid detergent and an intensity of light passing through water mixed with a powder detergent. The first reference value may be set as a value between a magnitude of the electrical signal output from the light receiving element 220 that receives the light passing through the water mixed with the liquid detergent and light receiving light receiving the light passing through the water mixed with the powder detergent and a magnitude of the electrical signal output from the light receiving element 220 that receives the light passing through the water mixed with the powder detergent.

The first reference value may be variable. For example, when the amount of laundry changes, the amount of detergent to be injected is changed, and thus the first reference value may vary depending on the amount of laundry. As the amount of laundry increases, the first reference value may increase, and as the amount of laundry decreases, the first reference value may decrease.

When the sum of the output values of the optical sensor 200 is greater than or equal to the first reference value (YES in 1130), the washing machine 100 may identify that the injected detergent is the liquid detergent (1140).

When the sum of the output values of the optical sensor 200 is greater than or equal to the first reference value, the washing machine 100 may determine that the intensity of light passing through the water mixed with the detergent is greater than or equal to the reference intensity. When the intensity of light passing through the water in which the detergent is mixed is greater than or equal to the reference intensity, the washing machine 100 may determine that the concentration of the particles floating in the water is low or the size of the particles is small.

In general, it is known that the particles of the liquid detergent are smaller than the particles of the powder detergent. In addition, as described above, as the particles mixed with the water decreases, the scattering rate of the infrared ray may decrease, and as the particles mixed with water increase, the scattering rate of the infrared ray may increases. Therefore, an intensity of the infrared ray passing through the water mixed with the liquid detergent is greater than the intensity of the infrared ray passing through the water mixed with the powder detergent.

For the above reason, the controller 170 may identify that the detergent injected into the tub 120 is the liquid detergent when the sum of the output values of the optical sensor 200 is greater than or equal to the first reference value.

In addition, when the sum of the output values of the optical sensor 200 is greater than or equal to the first reference value, it may be determined that the turbidity of water is less than the reference value. Therefore, when the turbidity of water is less than the reference value, the controller 170 may identify that the detergent injected into the tub 120 is the liquid detergent.

When the sum of the output values of the optical sensor 200 is not more than the first reference value (NO in 1130), the washing machine 100 may identify that the input detergent is the powder detergent (1150).

When the sum of the output values of the optical sensor 200 is less than the first reference value, it may be determined that the intensity of light passing through the water mixed with the detergent is less than the reference intensity. When the intensity of light passing through the water mixed with the detergent is less than the reference intensity, it may be determined that the concentration of the particles floating in the water is large or the size of the particles is large.

Accordingly, when the sum of the output values of the optical sensor 200 is less than the first reference value, the controller 170 may identify that the detergent injected into the tub 120 is the powder detergent.

In addition, when the sum of the output values of the optical sensor 200 is less than the first reference value, it may be determined that the turbidity of water is greater than the reference value. Accordingly, when the turbidity of water is greater than the reference value, the controller 170 may identify that the detergent injected into the tub 120 is the powder detergent.

As described above, the washing machine 100 including the optical sensor 200 for measuring the cleanliness or the turbidity of water using light having the plurality of wavelengths may identify whether the detergent is the liquid detergent or the powder detergent based on a result of comparing the received intensity of light having the plurality of wavelengths with the reference value.

Depending on whether the detergent is the liquid detergent or the powder detergent, a reference value for an operation to be described below may be set.

Figure 18:
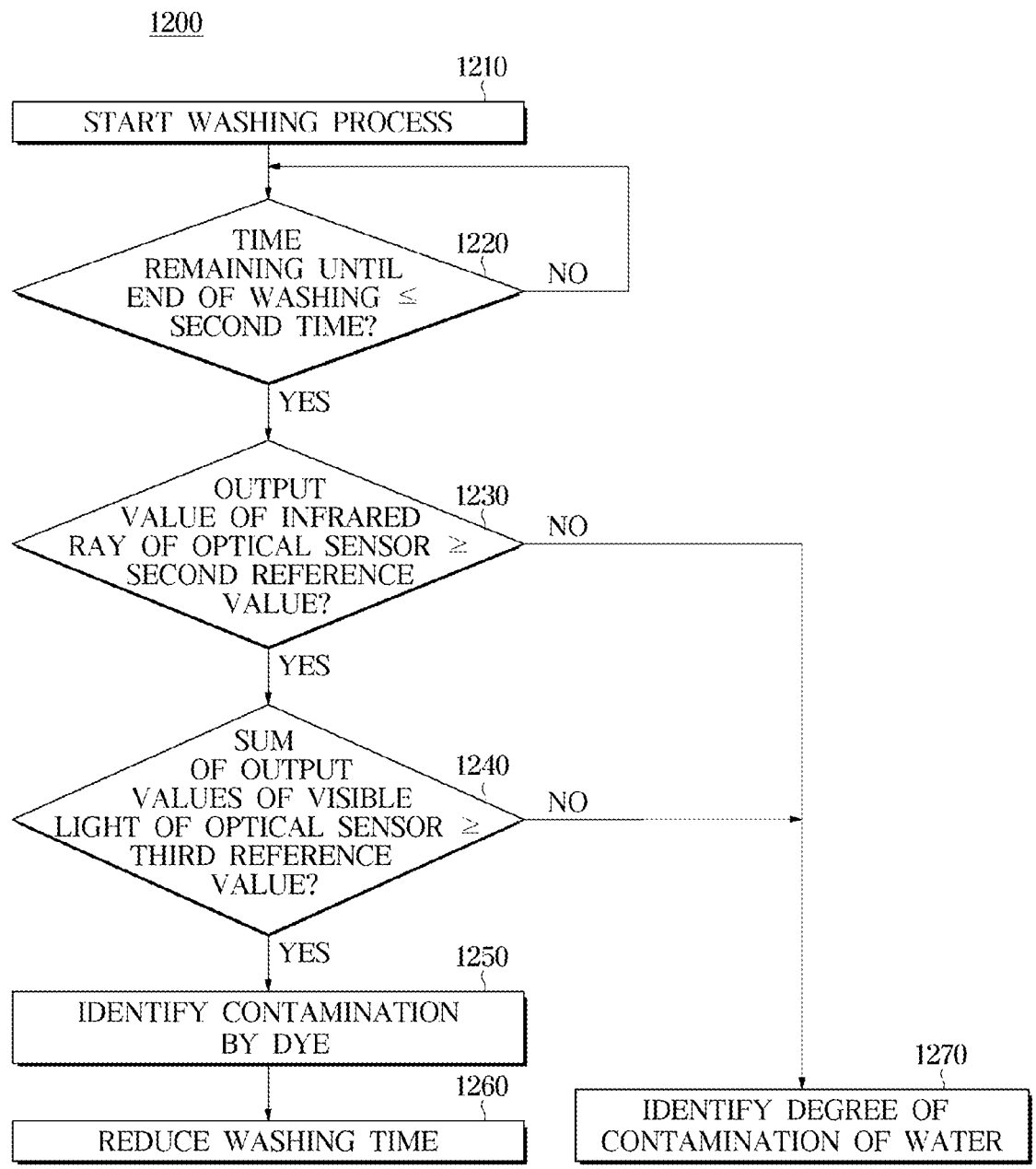
FIG. 18 is a view illustrating an operation for identifying contamination of water by a dye during a washing process of a washing machine according to an embodiment.

FIG. 18 is a view illustrating an operation for identifying contamination of water by a dye during a washing process of a washing machine according to an embodiment.

As illustrated in FIG. 18, the washing machine 100 may measure the cleanliness or the turbidity of water by the visible light and the cleanliness or the turbidity of water by the infrared ray during the washing process, and may identify whether contamination by the dye depending on the measured cleanliness or turbidity (1200).

The washing machine 100 may start the washing process (1210).

The controller 170 may open the water supply valve 151 for supplying water and detergent. Due to the opening of the water supply valve 151, the water may be supplied to the tub 120 together with the detergent.

When a water level of the tub 120 reaches a predetermined water level, the controller 170 may close the water supply valve 151, and may control the drum motor 135 to rotate the drum 130 at the low speed for washing of the laundry.

The washing may be performed during the washing time predetermined according to the washing course, or may be performed during the washing time determined by the user.

The washing machine 100 may determine whether the time remaining until the end of washing is less than or equal to a second time (1220).

The controller 170 may count the elapsed time after starting the washing. The controller 170 may compare the elapsed time with a difference between the washing time and the second time. In other words, the controller 170 may determine whether or not the time remaining until the end of the washing is less than or equal to the second time based on whether the elapsed time after the start of washing is greater than or equal to the difference between the washing time and the second time.

The second time may be set experimentally or empirically. The second time may be set to 5 minutes, for example.

The second time may be variable. For example, the second time may vary depending on the amount of laundry, or may vary depending on whether the injected detergent is the liquid detergent or the powder detergent.

When the time remaining until the end of washing is not less than or equal to the second time (NO in 1220), the washing machine 100 may continue to rotate the drum 130 for washing.

When the time remaining until the end of washing is less than or equal to the second time (YES in 1220), the washing machine 100 may determine whether the output value of the infrared ray of the optical sensor 200 is greater than or equal to a second reference value (1230).

When the time remaining until the end of washing is less than or equal to the second time, the controller 170 may determine whether to increase or decrease the washing time.

The controller 170 may control the optical sensor 200 to transmit the white light, and may receive the electrical signal (voltage or current) output from the optical sensor 200. The controller 170 may receive the electrical signal output from the fourth photodiode 222IR that receives the infrared ray.

The controller 170 may compare the magnitude of the electrical signal output from the fourth photodiode 22218 that receives the infrared ray with the second reference value. In other words, the controller 170 may compare the value representing the cleanliness of water measured by the infrared ray with the second reference value.

The second reference value may be set experimentally or empirically. The second reference value may be set based on the intensity of the infrared ray passing through the water mixed with small dyes and the intensity of the infrared ray passing through the water mixed with large particles (e.g., dust, detergent, etc.). The second reference value may be set to, for example, a value between the magnitude of the electrical signal output from the fourth photodiode 2221R that receives the infrared ray passing through water mixed with the dye and the magnitude of the electrical signal output from the fourth photodiode 2221R that receives the infrared ray passing through water mixed with large particles.

The second reference value may be variable. For example, when the amount of laundry changes, the amount of detergent to be injected is changed, and thus the second reference value may vary depending on the amount of laundry. In addition, since the scattering rate at which the infrared ray are scattered in the water varies according to the type of detergent, the second reference value may vary depending on whether the detergent is the liquid detergent or the powder detergent.

When the output value of the infrared ray of the optical sensor 200 is greater than or equal to the second reference value (YES in 1230), the controller 170 may determine whether the sum of the output values of the visible light of the optical sensor 200 is greater than or equal to the third reference value (1240).

When the output value by the infrared ray of the optical sensor 200 is greater than or equal to the second reference value (that is, when the turbidity of water measured by the infrared ray is less than the reference value), the controller 170 may determine that the water is contaminated by small particles such as dyes or that the water is not contaminated.

In order to identify whether the water is contaminated by small particles such as the dye or not, the controller 170 may calculate the sum of the magnitudes of the electrical signals output from the first, second, and third photodiodes 222B, 222G, 222R, and 22218. In other words, the controller 170 may calculate the sum of the value representing the cleanliness of water measured by the blue light, the value representing the cleanliness of water measured by the green light, and the value representing the cleanliness of water measured by the red light.

The controller 170 may compare the sum of the output values of the optical sensor 200 by the visible light with the third reference value.

The third reference value may be set experimentally or empirically. The third reference value may be set based on the intensity of light passing through the water in which small particles such as the dyes are mixed and the intensity of light passing through clean water. The first reference value may be set to, for example, the value between the magnitude of the electrical signal output from the light receiving element 220 that receives light passing through the water in which the small particles such as the dyes are mixed and the magnitude of the electrical signal output from the light receiving element 220 that receives light passing through the clean water.

The third reference value may be variable. For example, the third reference value may vary depending on the amount of laundry. Further, the third reference value may be varied depending on whether the detergent is the liquid detergent or the powder detergent.

When the sum of the output values of the visible light of the optical sensor 200 is not more than the third reference value (NO in 1240), the washing machine 100 may identify that the water in the tub 120 is contaminated by the dye (1250).

When the output value of the infrared ray of the optical sensor 200 is greater than the second reference value and the output value of the visible light of the optical sensor 200 is less than the third reference value, it is determined that the scattering rate of the infrared ray is small and the scattering rate of the visible light is large.

As described above, as the particles mixed with the water decreases, the scattering rate of the infrared ray may decrease, and as the particles mixed with the water increase, the scattering rate of the infrared ray may increase. When the sum of the magnitudes of the electrical signals output from the first, second, and third photodiodes 222B, 222G, 222R, and 2221R receiving the visible light is less than the third reference value, the controller 170 may identify that the dye is typically mixed with the water of the tub 120 with small-sized particles.

The dye may be included in the laundry for dyeing the laundry, and the dye may be separated from the laundry during washing. The laundry's dye may be separated from the laundry by the chemical action of the detergent.

The dye may scatter the light having the specific wavelength or the light having different wavelengths depending on the color. Accordingly, the light having the specific wavelength or the light having different wavelengths may not pass through the water mixed with the dye. Accordingly, the intensity of light received by the first, second, and third photodiodes 222B, 222G, 222R, and 2221R may be reduced, and the electrical signals output from the first, second, and third photodiodes 222B, 222G, 222R, 2221R may be reduced.

The washing machine 100 may reduce the washing time (1260).

When the water contained in the tub 120 is contaminated by the dye, the dye may contaminate other laundry. In other words, the color of other laundry may be changed by the dye.

In order to prevent this, the washing machine 100 may reduce the washing time and discharge the water from the tub 120.

In operation 1230, when the output value of the infrared ray of the optical sensor 200 is not more than the second reference value (NO in 1230), the washing machine 100 may identify a degree of contamination of water (1270).

When the magnitude of the electrical signal output from the fourth photodiode 22218 receiving the infrared ray is smaller than the second reference value, it may be determined that the particles are mixed with the water of the tub 120. In order to adjust the washing time, the controller 170 may identify the degree of contamination of water.

Further, in operation 1240, when the sum of the output values of the visible light of the optical sensor 200 is greater than or equal to the third reference value (YES in 1240), the washing machine 100 may identify the degree of contamination of water (1270).

When the output value of the infrared ray of the optical sensor 200 is greater than the second reference value and the output value of the visible light of the optical sensor 200 is greater than the third reference value, it may be determined that the water is clean. In order to adjust the washing time, the controller 170 may identify the degree of contamination of water.

As described above, the washing machine 100 may determine whether the water contained in the tub 120 is contaminated by the dye based on the output of the infrared ray of the optical sensor 200 and the output of the optical sensor of the visible light. In addition, the washing machine 100 may include the first photodiode 222B capable of receiving the blue light, the second photodiode 222G capable of receiving the green light, and the third photodiode 222R capable of receiving the red light to detect dyes of all colors. When it is determined that the water is contaminated by the dye, the washing machine 100 may prevent the color of other laundry from being changed by the dye by reducing the washing time.

Figure 19:
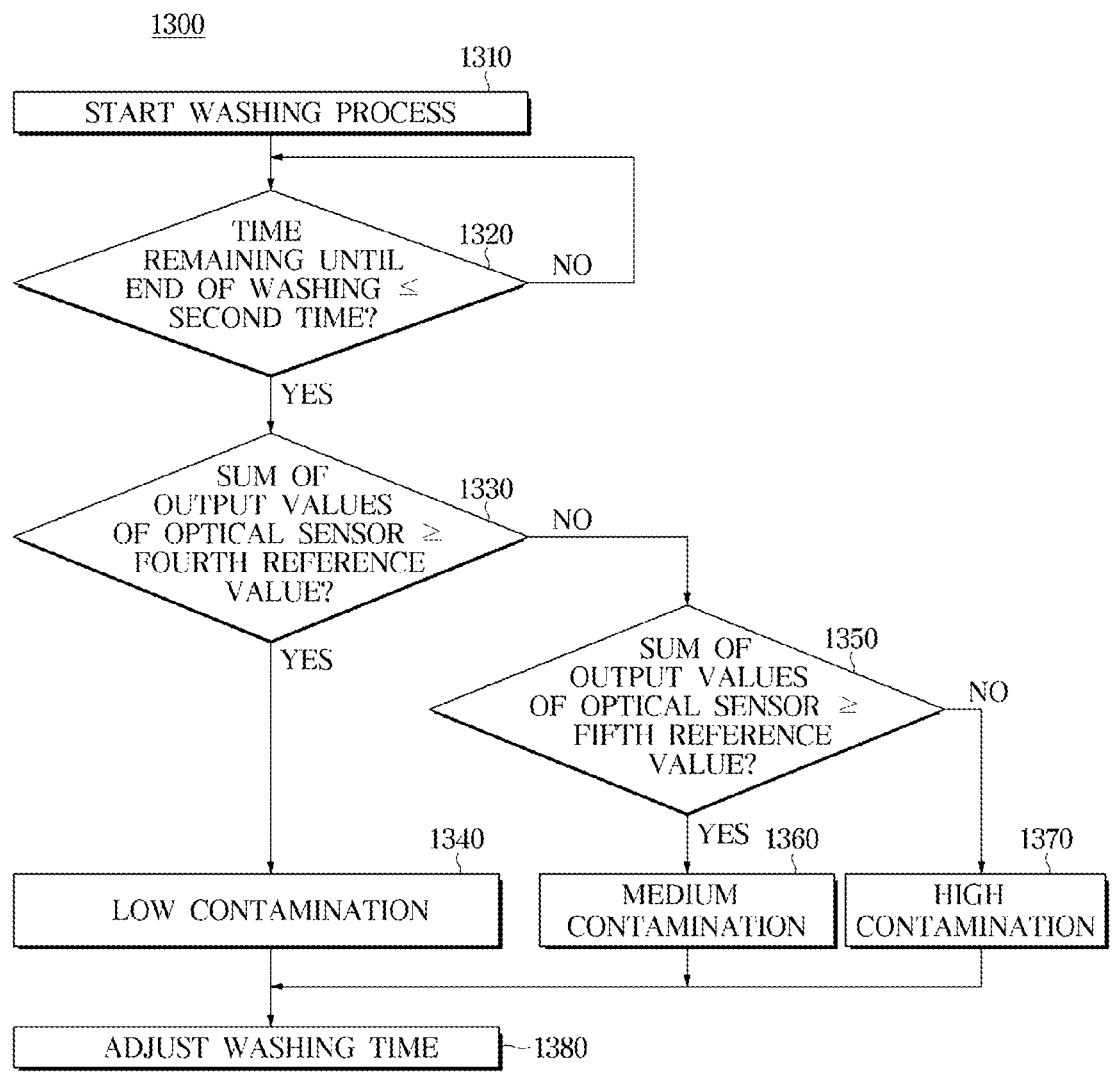
FIG. 19 is a view illustrating an operation for identifying a degree of contamination of water during a washing process of a washing machine according to an embodiment.

FIG. 19 is a view illustrating an operation for identifying a degree of contamination of water during a washing process of a washing machine according to an embodiment.

As illustrated in FIG. 19, the washing machine 100 may measure the cleanliness or the turbidity of water by light during the washing process, and identify the degree of contamination of water depending on the measured cleanliness or turbidity (1300).

The washing machine 100 may start the washing process (1310). The washing machine 100 may determine whether the time remaining until the end of washing is less than or equal to the second time (1320).

Operations 1310 and 1320 may be the same as operations 1210 and 1220 illustrated in FIG. 18, respectively.

When the time remaining until the end of washing is less than or equal to the second time (YES in 1320), the washing machine 100 may determine whether the sum of the output values of the optical sensor 200 is greater than or equal to the fourth reference value (1330).

The controller 170 may determine the degree of contamination of water contained in the tub 120.

In order to determine the degree of contamination of water contained in the tub 120, the controller 170 may calculate the sum of the magnitudes of the electrical signals output from the first, second, third, and fourth photodiodes 222B, 222G, 222R, and 22218. In other words, the controller 170 may calculate the sum of the value representing the cleanliness of water (inverse proportion to turbidity) measured by the blue light, the value representing the cleanliness of water measured by the green light, the value representing the cleanliness of water measured by the red light, and the value representing the cleanliness of water measured by the infrared ray.

The controller 170 may compare the sum of output values of the optical sensor 200 with the fourth reference value in order to determine the turbidity or the cleanliness of water contained in the tub 120.

The fourth reference value may be set experimentally or empirically. For example, the fourth reference value may be set based on the turbidity indicating low contamination of water used for washing.

The fourth reference value may be variable. For example, the fourth reference value may vary depending on the amount of laundry. Further, the fourth reference value may vary depending on whether the detergent is the liquid detergent or the powder detergent.

When the sum of the output values of the optical sensor 200 is greater than or equal to the fourth reference value (YES in 1330), the washing machine 100 may determine the degree of contamination of water as low contamination (1340).

When the value representing the cleanliness of water measured by the infrared ray and the visible light is greater than or equal to the fourth reference value, the controller 170 may determine the degree of contamination of water contained in the tub 120 as the low contamination.

When the sum of the output values of the optical sensor 200 is not more than the fourth reference value (NO in 1330), it is determined whether the sum of the output values of the optical sensor 200 is more than the fifth reference value (1350).

When the sum of the output values of the optical sensor 200 is not more than the fourth reference value (that is, when the turbidity of water measured by light is greater than the reference value indicating the low contamination), the controller 170 may identify whether the degree of contamination of the water contained in the tub 120 is medium contamination or high contamination.

In order to identify whether the degree of contamination of the water contained in the tub 120 is the medium contamination or the high contamination, the controller 170 may compare the sum of the output values of the optical sensor 200 with a fifth reference value. The fifth reference value may be a value smaller than the fourth reference value.

The fifth reference value may be set experimentally or empirically. For example, the fifth reference value may be set based on the turbidity indicating high contamination of water contained in the tub 120.

The fifth reference value may be variable. For example, the fifth reference value may vary depending on the amount of laundry. Further, the fifth reference value may be varied depending on whether the detergent is the liquid detergent or the powder detergent.

When the sum of the output values of the optical sensor 200 is greater than or equal to the fifth reference value (YES in 1350), the washing machine 100 may determine the degree of contamination of water as the medium contamination (1360).

When the value representing the cleanliness of water measured by the infrared ray and the visible light is greater than or equal to the fifth reference value, the controller 170 may determine the degree of contamination of water contained in the tub 120 as the medium contamination.

When the sum of the output values of the optical sensor 200 is not more than the fifth reference value (NO in 1350), the washing machine 100 may determine the degree of contamination of water as the high contamination (1370).

When the value representing the cleanliness of water measured by the infrared ray and the visible light is less than the fifth reference value, the controller 170 may determine the degree of contamination of water contained in the tub 120 as the high contamination.

Thereafter, the washing machine 100 may adjust the washing time (1380).

The controller 170 may adjust the washing time based on whether the degree of contamination of the water contained in the tub 120 is low, medium, or high contamination.

For example, the controller 170 may maintain the washing time in response to the degree of contamination of water contained in the tub 120 being the low contamination, increase the washing time by the first time in response to the degree of contamination of the water contained in the tub 120 being the medium contamination, and increase the washing time by the second time greater than the first time in response to the degree of contamination of the water contained in the tub 120 being the high contamination.

As another example, the controller 170 may reduce the washing time in response to the degree of contamination of water contained in the tub 120 being the low contamination, maintain the washing time in response to the degree of contamination of water contained in the tub 120 being the medium contamination, and increase the washing time in response to the degree of contamination of water contained in the tub 120 being the high contamination.

As described above, the washing machine 100 may measure the cleanliness or the turbidity of water using the visible light and the infrared ray, and adjust the washing time based on the cleanliness or turbidity of water. Thereby, an operating time of the washing machine 100 may be reduced.

Figure 20:
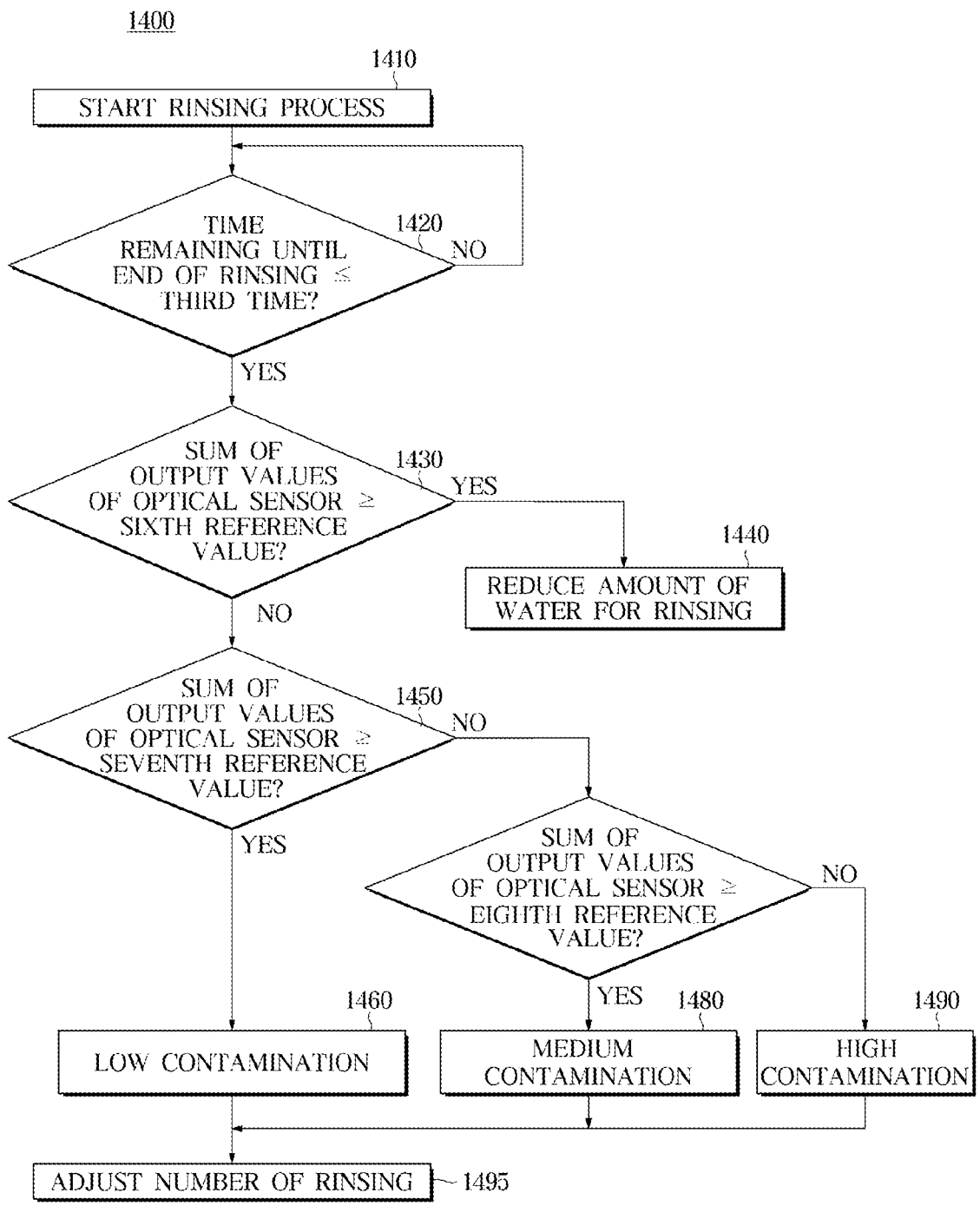
FIG. 20 is a view illustrating an operation for identifying a degree of contamination of water during a rinsing process of a washing machine according to an embodiment.

FIG. 20 is a view illustrating an operation for identifying a degree of contamination of water during a rinsing process of a washing machine according to an embodiment.

As illustrated in FIG. 20, the washing machine 100 may measure the cleanliness or the turbidity of water by light during the washing process, and identify the degree of contamination of water depending on the measured cleanliness or turbidity (1400).

The washing machine 100 may start the rinsing process (1410).

The controller 170 may open the water supply valve 151 for water supply. Due to the opening of the water supply valve 151, the water may be supplied to the tub 120 via the detergent compartment 141, but the detergent from the detergent compartment 141 has already been injected to the tub 120 during the washing process, so only the water is supplied to the tub 120 during water supply for rinsing.

When the water level of the tub 120 reaches the predetermined level, the controller 170 may close the water supply valve 151, and may control the drum motor 135 to rotate the drum 130 at the low speed for rinsing the laundry.

The rinsing may be performed during a predetermined washing time.

The washing machine 100 may determine whether the time remaining until the end of the rinsing is less than a third time (1420).

Operation 1420 may be the same as operation 1220 illustrated in FIG. 18.

When the time remaining until the end of rinsing is not less than the third time (NO in 1420), the washing machine 100 may continue to rotate the drum 130 for rinsing.

When the time remaining until the end of the rinsing is less than the third time (YES in 1420), the washing machine 100 may determine whether the sum of the output values of the optical sensor 200 is greater than or equal to a sixth reference value (1430).

When the time remaining until the end of the rinsing is less than the second time, the controller 170 may determine whether to increase or decrease the rinsing time.

The controller 170 may compare the sum of the output values of the optical sensor 200 with the sixth reference value in order to determine the turbidity or the cleanliness of water contained in the tub 120. The sixth reference value may be set experimentally or empirically, and may be varied.

When the sum of the output values of the optical sensor 200 is greater than or equal to the sixth reference value (YES in 1430), the washing machine 100 may reduce the amount of water for rinsing (1440).

When the value representing the cleanliness of water measured by the infrared ray and the visible light is equal to or greater than the sixth reference value, the controller 170 may determine that water used for rinsing is not contaminated.

Accordingly, the controller 170 may reduce the amount of water used for rinsing in order to reduce the consumption of water.

When the sum of the output values of the optical sensor 200 is not greater than or equal to the sixth reference value (NO in 1430), the washing machine 100 may determine whether the sum of the output values of the optical sensor 200 is more than a seventh reference value (1450).

When the sum of the output values of the optical sensor 200 is greater than or equal to the seventh reference value (YES in 1450), the washing machine 100 may determine the degree of contamination of water as the low contamination (1460).

When the sum of the output values of the optical sensor 200 is not greater than the seventh reference value (NO in 1450), it is determined whether the sum of the output values of the optical sensor 200 is greater than a eighth reference value (1470)).

When the sum of the output values of the optical sensor 200 is greater than or equal to the eighth reference value (YES in 1470), the washing machine 100 may determine the degree of contamination of water as the medium contamination (1480).

When the sum of the output values of the optical sensor 200 is not greater than the eighth reference value (NO in 1470), the washing machine 100 may determine the degree of contamination of water as the high contamination (1490).

Operations 1450, 1460, 1470, 1480, and 1490 may be the same as operations 1330, 1340, 1350, 1360, and 1370 illustrated in FIG. 19.

Thereafter, the washing machine 100 may adjust the number of rinsing (1495).

The controller 170 may adjust the number of rinsing based on whether the degree of contamination of the water contained in the tub 120 is the low, medium, or high contamination.

For example, the controller 170 may terminate the rinsing process in response to the degree of contamination of water contained in the tub 120 being the low contamination, maintain the number of rinsing in response to the degree of contamination of water contained in the tub 120 being the medium contamination, and increase the number of rinsing in response to the degree of contamination of water contained in the tub 120 being the high contamination.

In addition, the washing machine 100 may adjust the rinsing time. For example, the controller 170 may reduce the rinsing time in response to the degree of contamination of water contained in the tub 120 being the low contamination, maintain the rinsing time in response to the degree of contamination of water contained in the tub 120 being the medium contamination, and increase the rinsing time in response to the degree of contamination of water contained in the tub 120 being the high contamination.

As described above, the washing machine 100 may measure the cleanliness or the turbidity of water using the visible light and the infrared ray, and may adjust the amount of water for rinsing, the number of rinsing and/or the rinsing time based on the cleanliness or the turbidity of the water. Thereby, the operating time of the washing machine 100 may be reduced, and the water consumption of the washing machine 100 may be reduced.

Figure 21:
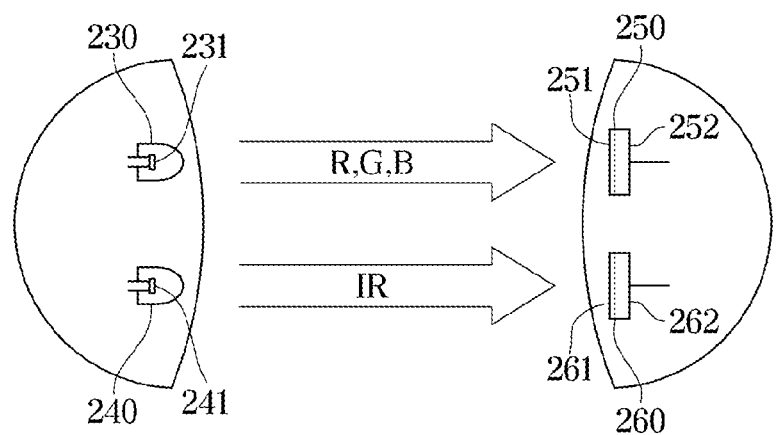
FIGS. 21 and 22 is a view illustrating another example of an optical sensor included in a washing machine according to an embodiment.
Figure 22:
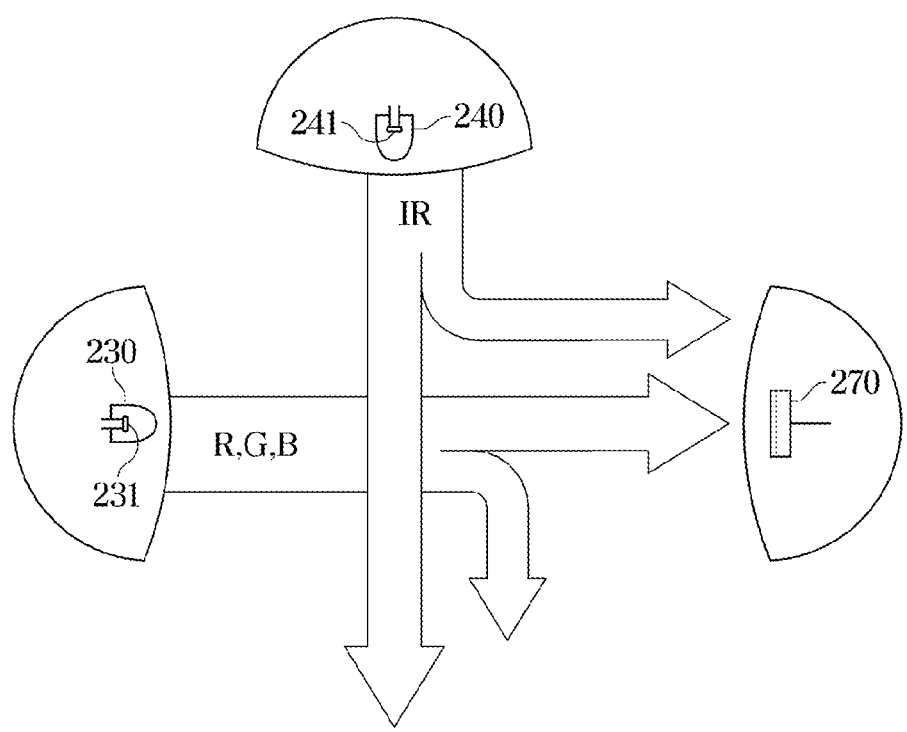

FIGS. 21 and 22 is a view illustrating another example of an optical sensor included in a washing machine according to an embodiment.

As illustrated in FIG. 21, the optical sensor 200 may include a first light emitting element 230 for emitting the visible light, a second light emitting element 240 for emitting the infrared ray, a first light receiving element 250 for receiving the visible light emitted from the first light emitting element 230, and a second light receiving element 260 for receiving the infrared ray emitted from the second light emitting element 240.

The first light emitting element 230 may include a first light emitting diode 231 capable of emitting the visible light. The first light receiving element 250 may include a first color filter 251 that passes blue visible light, green visible light, and red visible light, and a first photodiode 252 that outputs the electrical signal (voltage or current) depending on the intensity of each of the blue visible light, the green visible light, and the red visible light.

The first light emitting diode 231 may emit the white light including the blue light, the green light, and the red light. The first color filter 251 selectively passes the blue light, the green light, and the red light. The first photodiode 252 may output a first electrical signal, a second electrical signal, and a third electrical signal depending on the intensity of each of the blue light, the green light, and the red light.

The second light emitting element 240 may include a second light emitting diode 241 capable of emitting the infrared ray. The second light receiving element 260 may include a second color filter 261 that passes the infrared ray and a second photodiode 262 that outputs the electrical signal (voltage or current) depending on the intensity of the infrared ray.

The first light emitting element 230 may emit the white visible light toward the first light receiving element 250. The first light receiving element 250 may receive the blue light, the green light, and the red light that are not scattered by the water contained in the tub 120 among the white visible light emitted from the first light emitting element 230.

The second light emitting element 240 may be disposed parallel to the first light emitting element 230 and may emit the infrared ray toward the second light receiving element 260. The second light receiving element 260 may be disposed in parallel with the first light receiving element 250 and is not scattered by the water contained in the tub 120 among the infrared ray transmitted from the second light emitting element 240.

Accordingly, the magnitude of the electrical signal output from the first and second light receiving elements 250 and 260 is proportional to the cleanliness of water contained in the tub 120 and may be inversely proportional to the turbidity of water.

As illustrated in FIG. 22, the optical sensor 200 may include the first light emitting element 230 that emits the visible light, the second light emitting element 240 that emits the infrared ray, and a third light receiving element 270 for receiving the visible light and the infrared ray emitted from the first light emitting element 230 and the second light emitting element 240, respectively.

The first light emitting element 230 may include the first light emitting diode 231 capable of emitting the visible light, and the second light emitting element 240 may include the second light emitting diode 241 capable of emitting the infrared ray.

The first and second light emitting diodes 231 and 241 may emit the white visible light and the infrared ray, respectively, in the same manner as the first and second light emitting diodes 231 and 241 illustrated in FIG. 21.

The third light receiving element 270 may include a third color filter 271 for selectively passing the blue visible light, the green visible light, the red visible light, and a third photodiode 272 that outputs the electrical signal (voltage or current) depending on the intensity of each of the blue visible light, the green visible light, the red visible light, and the infrared ray.

The first light emitting element 230 may emit the white visible light toward the third light receiving element 270. The second light emitting element 240 may emit the infrared ray toward a position other than the third light receiving element 270. For example, an optical path of the infrared ray emitted from the second light emitting element 240 may be substantially orthogonal to an optical path of the white visible light emitted from the first light emitting element 230.

The third light receiving element 270 may receive the blue light, the green light, and the red light that are not scattered by the water contained in the tub 120 among the white visible light emitted from the first light emitting element 230. Also, the third light receiving element 270 may receive the infrared ray scattered toward the third light receiving element 270 among the infrared ray emitted from the second light emitting element 240.

Therefore, the magnitude of the electrical signals by the blue visible light, the green visible light, and the red visible light output from the third light receiving element 270 may be proportional to the cleanliness of water contained in the tub 120, and may be inversely proportional to the turbidity of water. On the other hand, the magnitude of an electrical signal by the infrared ray output from the third light receiving element 270 may be inversely proportional to the cleanliness of water contained in the tub 120 and may be proportional to the turbidity of water.

As described above, the washing machine 100 may measure the cleanliness or the turbidity of water contained in the tub 120 by using the optical sensor 200 in which the optical path of the visible light and the optical path of the infrared ray are different. However, it is preferable that the optical path of the visible light and the optical path of the infrared ray are close to each other.

The washing machine may include a tub; a drum rotatably provided in the tub; a detergent supplier who can supply the detergent to the tub; a water supplier who can supply the water to the tub; an optical sensor provided on a lower part of the tub and including the light receiving element selectively receiving a plurality of visible rays having different wavelengths and the infrared ray among the light emitted from the light emitting element; and a controller that controls the water supplier and rotates the drum to supply the detergent and the water to the tub during washing. In addition, the controller may control the optical sensor to emit the light, receive the received intensity of the plurality of visible rays and the received intensity of the infrared ray from the optical sensor, and adjust the washing time based on the sum of the received intensities of the plurality of visible rays and the received intensity of the infrared ray.

The plurality of visible rays having different wavelengths may include at least blue visible light, green visible light, and red visible light.

When the time remaining until the end of washing is less than or equal to the first time, the controller may control the light emitting element to emit light toward the light receiving element, and may receive, from the light receiving element, the received intensities of the plurality of visible rays having different wavelengths and the received intensity of the infrared ray.

The washing machine may determine whether the water is contaminated by the dye of the laundry based on the sum of the received intensities of the plurality of visible rays and the received intensity of infrared ray, and may prevent the color of other laundry from being changed due to the dye by reducing the washing time.

When the received intensity of the infrared ray is greater than a first reference and the sum of the received intensities of the plurality of visible rays is less than a second reference, the controller may reduce the washing time.

When the received intensity of infrared ray is greater than the first reference and the sum of the received intensities of the plurality of visible rays is less than the second reference, the washing machine may identify that the water is contaminated by the dye of the laundry, and may prevent the color of other laundry from being changed due to the dye by reducing the washing time.

The controller may adjust the washing time based on the sum of the received intensities of the plurality of visible rays and the received intensity of the infrared ray.

The controller may control the water supplier to supply water to the tub during rinsing and rotate the drum, and the controller may adjust the number of rinsing based on the sum of the received intensities of the plurality of visible rays and the received intensity of the infrared ray.

The washing machine may reduce the operating time of the washing machine by reducing the washing time and/or the rinsing time.

When the time elapsed after supplying the detergent and the water to the tub during washing is more than the second time, the controller may identify the type of detergent based on the sum of the received intensities of the plurality of visible rays and the received intensity of the infrared ray.

The light emitting element may include a light emitting diode that emits light having a predetermined wavelength, and a phosphor that emits light having a plurality of different wavelengths in response to receiving light emitted from the light emitting diode.

The washing machine may measure the cleanliness or turbidity of water using the white light.

The light receiving element may include a filter array including a plurality of color filters that selectively emit the plurality of visible rays having a different wavelength, respectively, an infrared filter that selectively emits the infrared ray, and a photodiode array including a plurality of photodiodes for receiving rays emitted through the filter array.

The washing machine may more accurately measure the cleanliness or the turbidity of water by using the plurality of visible rays and infrared ray having different wavelengths.

The light receiving element may include a filter array including a blue filter that selectively emits the blue visible light, a green filter that selectively emits the green visible light, a red filter that selectively emits the red visible light, and an infrared filter that selectively emits the infrared ray, and a photodiode array including a first photodiode for receiving the blue visible light emitted through the blue filter, a second photodiode for receiving the green visible light emitted through the green filter, a third photodiode for receiving the red visible light emitted through the red filter, and a fourth photodiode for receiving the infrared ray emitted through the infrared filter.

The washing machine may more accurately measure the cleanliness or the turbidity of water by using the blue visible light, the green visible light, the red visible light, and the infrared ray.

The disclosed embodiments may be implemented in the form of a recording medium storing computer-executable instructions that are executable by a processor. The instructions may be stored in the form of a program code, and when executed by a processor, the instructions may generate a program module to perform operations of the disclosed embodiments. The recording medium may be implemented non-transitory as a computer-readable recording medium.

The non-transitory computer-readable recording medium may include all kinds of recording media storing commands that can be interpreted by a computer. For example, the non-transitory computer-readable recording medium may be, for example, ROM, RAM, a magnetic tape, a magnetic disc, flash memory, an optical data storage device, etc.

Embodiments of the disclosure have thus far been described with reference to the accompanying drawings. It should be obvious to a person of ordinary skill in the art that the disclosure may be practiced in other forms than the embodiments as described above without changing the technical idea or essential features of the disclosure. The above embodiments are only by way of example, and should not be interpreted in a limited sense.

The invention claimed is:

1. A washing machine comprising:
   a tub;
   a drum rotatably disposed in the tub;
   a detergent supplier configured to supply a detergent to the tub;
   a water supplier configured to supply a water to the tub;

an optical sensor provided on a lower part of the tub, wherein the optical sensor includes a light emitting element and a light receiving element configured to selectively receive a plurality of visible rays having different wavelengths and an infrared ray, among a light emitted from the light emitting element; and a controller configured to:
control the water supplier to supply the detergent and the water to the tub and rotate the drum during a washing,
control the optical sensor to emit the light,
receive intensities of the plurality of visible rays and a received intensity of the infrared ray from the optical sensor,
determine a sum of (i) the received intensities of the plurality of visible rays and (ii) the received intensity of the infrared ray, and
adjust a washing time based on the determined sum of the received intensities of the visible and infrared rays.

2. The washing machine according to claim 1, wherein the plurality of visible rays having the different wavelengths comprise at least blue visible light, green visible light, and red visible light.

3. The washing machine according to claim 1, wherein, based on a time remaining until an end of the washing being less than or equal to a first time, the controller is configured to:
control the light emitting element to emit the light toward the light receiving element, and
receive, from the light receiving element, the received intensities of the plurality of visible rays having the different wavelengths and the received intensity of the infrared ray.

4. The washing machine according to claim 1, wherein, based on the received intensity of the infrared ray being greater than a first reference and a sum of the received intensities of the plurality of visible rays being less than a second reference, the controller is configured to reduce the washing time.

5. The washing machine according to claim 1, wherein, based on a time elapsed after supplying the detergent and the water to the tub during the washing being greater than or equal to a second time, the controller is configured to identify a type of the detergent based on the sum of the received intensities of the plurality of visible rays and cii) the received intensity of the infrared ray.

6. The washing machine according to claim 1, wherein the controller is configured to:
control the water supplier to supply the water to the tub and rotate the drum during a rinsing, and
adjust a number of rinsing based on the sum of (i) the received intensities of the plurality of visible rays and (ii) the received intensity of the infrared ray.

7. The washing machine according to claim 1, wherein the light emitting element comprises a light emitting diode configured to emit a light having a predetermined wavelength, and a phosphor configured to emit rays having a plurality of different wavelengths in response to receiving the light emitted from the light emitting diode.

8. The washing machine according to claim 1, wherein the light receiving element comprises:
a filter array including a plurality of color filters, the plurality of color filters configured to selectively transmit the plurality of visible rays having the different wavelengths, respectively, and an infrared filter configured to selectively transmit the infrared ray; and
a photodiode array including a plurality of photodiodes configured to receive rays transmitted through the filter array.

9. The washing machine according to claim 1, wherein the light receiving element comprises:
a filter array including a blue filter configured to selectively transmit a blue visible light, a green filter configured to selectively transmit a green visible light, a red filter configured to selectively transmit a red visible light, and an infrared filter configured to selectively transmit the infrared ray; and
a photodiode array including a first photodiode configured to receive the blue visible light transmitted through the blue filter, a second photodiode configured to receive the green visible light transmitted through the green filter, and a third photodiode configured to receive the red visible light transmitted through the red filter, and a fourth photodiode configured to receive the infrared ray transmitted through the infrared filter.

10. A method of controlling a washing machine comprising:
supplying, by a controller, a detergent and a water to a tub and rotating a drum rotatably disposed in the tub, during a washing;
based on a time remaining until an end of the washing being less than or equal to a first time, emitting rays having different wavelengths, by a light emitting element of an optical sensor provided on a lower part of the tub;
receiving a plurality of visible rays having the different wavelengths and an infrared ray, by a light receiving element of the optical sensor;
determine a sum of (i) received intensities of the plurality of visible rays and (ii) received intensity of the infrared ray; and
adjusting, by the controller, a washing time based on the determined sum of the received intensities of the visible and infrared rays.

11. The method according to claim 10, wherein the plurality of visible rays having the different wavelengths comprise at least blue visible light, green visible light, and red visible light.

12. The method according to claim 10, wherein the adjusting of the washing time comprises:
based on the received intensity of the infrared ray being greater than a first reference and a sum of the received intensities of the plurality of visible rays being less than a second reference, reducing the washing time.

13. The method according to claim 10, further comprising:
identifying, by the controller, a type of the detergent based on the sum of (i) the received intensities of the plurality of visible rays and (ii) the received intensity of the infrared ray.

14. A washing machine comprising:
a tub;
a drum rotatably disposed in the tub;
an optical sensor provided on a lower part of the tub, wherein the optical sensor includes a light emitting element and a light receiving element configured to selectively receive a plurality of visible rays having different wavelengths and an infrared ray among a light emitted from the light emitting element; and
a controller configured to control the light emitting element to emit the light towards the light receiving element, wherein the light receiving element comprises:
   a filter array including a plurality of color filters configured to selectively transmit the plurality of visible rays each having the different wavelength and an infrared filter configured to selectively transmit the infrared ray, and
   a photodiode array including a plurality of photodiodes configured to receive rays transmitted through the filter array, and
wherein the controller is further configured to:
   determine a sum of (i) received intensities of the plurality of visible rays and (ii) a received intensity of the infrared ray; and
   adjust a washing time based on a determined sum of received intensities of the visible and infrared rays.

15. The washing machine according to claim 14, wherein the plurality of visible rays having the different wavelengths comprise at least blue visible light, green visible light, and red visible light.

16. The washing machine according to claim 14, wherein:
   the filter array comprises a blue filter configured to selectively transmit a blue visible light, a green filter configured to selectively transmit a green visible light, and a red filter configured to selectively transmit a red visible light; and
   the photodiode array comprises a first photodiode configured to receive the blue visible light transmitted through the blue filter, a second photodiode configured to receive the green visible light transmitted through the green filter, and a third photodiode configured to receive the red visible light transmitted through the red filter, and a fourth photodiode configured to receive the infrared ray transmitted through the infrared filter.

17. The washing machine according to claim 14, wherein the light emitting element comprises a light emitting diode configured to emit a light having a predetermined wavelength, and a phosphor configured to emit rays having a plurality of different wavelengths in response to receiving the light emitted from the light emitting diode.

18. The washing machine according to claim 14, wherein:
   the light emitting element comprises a first light emitting element configured to emit the plurality of visible rays having the different wavelengths and a second light emitting element configured to emit the infrared ray;
   the first light emitting element is configured to emit the plurality of visible rays in a first direction; and
   the second light emitting element is configured to emit the infrared ray in a second direction orthogonal to the first direction.

* * * * *